US011067190B2

(12) United States Patent
Davis

(10) Patent No.: US 11,067,190 B2
(45) Date of Patent: *Jul. 20, 2021

(54) LINEAR MAGNETIC VALVE ACTUATOR WITH EXTERNAL MAGNETS AND INTERNAL MAGNETIC FLUX PATH

(71) Applicant: Edward P. Davis, Kihei, HI (US)

(72) Inventor: Edward P. Davis, Kihei, HI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/118,339

(22) Filed: Dec. 10, 2020

(65) Prior Publication Data
US 2021/0088154 A1 Mar. 25, 2021

Related U.S. Application Data

(63) Continuation of application No. PCT/US2019/037338, filed on Jun. 14, 2019.
(Continued)

(51) Int. Cl.
*F16K 31/08* (2006.01)
*F16K 31/06* (2006.01)

(52) U.S. Cl.
CPC .......... *F16K 31/086* (2013.01); *F16K 31/06* (2013.01); *F16K 31/08* (2013.01)

(58) Field of Classification Search
CPC ......... F16K 31/06; F16K 31/08; F16K 31/086
See application file for complete search history.

(56) References Cited

U.S. PATENT DOCUMENTS 2,533,491 A * 12/1950 McMahon ............ F16K 31/086
251/65
6,161,722 A 12/2000 Sooudi et al.
(Continued)

FOREIGN PATENT DOCUMENTS

DE 1156616 B * 10/1963 .......... F16K 31/086
EP 0436214 A1 * 7/1991 .......... B65B 39/004
(Continued)

OTHER PUBLICATIONS

Computer-Generated Translation of EP1445523 retrieved from Google Patents Feb. 18, 2021; 13 pgs.
(Continued)

*Primary Examiner* — Umashankar Venkatesan
(74) *Attorney, Agent, or Firm* — K&L Gates LLP

(57) ABSTRACT

Various devices and techniques related to magnetically-actuated valves are generally described. In some examples, valves may include a bonnet defining an enclosure. In various examples, a movable valve member may be disposed in the enclosure. A valve stem may be disposed in the enclosure and may be operatively coupled to the movable valve member. A first internal ferromagnetic actuation member and a second internal ferromagnetic actuation member may be coupled to the valve stem. The first internal ferromagnetic actuation member and the second internal ferromagnetic actuation member may be disposed in a spaced relationship along the valve stem. In various examples, the valves may include an external actuator slidably engaged to an exterior surface of the valve bonnet. The external actuator may comprise a first magnet magnetically coupled to the first internal ferromagnetic actuation member and a second magnet magnetically coupled to the second internal ferromagnetic actuation member.

20 Claims, 28 Drawing Sheets

Related U.S. Application Data

(60) Provisional application No. 62/685,115, filed on Jun. 14, 2018.

(56) References Cited

U.S. PATENT DOCUMENTS

| | | | |
|---|---|---|---|
| 6,192,923 B1 * | 2/2001 | Schexnayder | F16K 31/06 137/487.5 |
| 2005/0236438 A1 | 10/2005 | Chastine et al. | |
| 2007/0289734 A1 | 12/2007 | McDonald et al. | |
| 2008/0157014 A1 * | 7/2008 | Vick, Jr. | F16K 31/086 251/65 |

FOREIGN PATENT DOCUMENTS

| | | | |
|---|---|---|---|
| EP | 1445523 | 1/2004 | |
| EP | 3165500 A1 * | 5/2017 | B67C 3/281 |

OTHER PUBLICATIONS

Author unknown; International Search Report and Written Opinion of PCT/US2019/037338; dated Oct. 15, 2019; 10 pgs.

\* cited by examiner

LINEAR MAGNETIC VALVE ACTUATOR WITH EXTERNAL MAGNETS AND INTERNAL MAGNETIC FLUX PATH

CROSS-REFERENCE TO RELATED APPLICATIONS

This application is a continuation of International Application No. PCT/US2019/037338 filed on Jun. 14, 2019, which claims the benefit of U.S. Provisional Application No. 62/685,115 filed Jun. 14, 2018. The disclosure of each of the foregoing applications is incorporated herein by reference in its entirety.

FIELD

This application relates to valve technology and, more specifically, to valve actuator mechanisms.

BACKGROUND

Valves often develop leaks as they age. Leaking valves can be annoying, wasteful, and can cause damage in residential settings, but can be far more problematic in industrial applications. Factory lines may need to be shutdown to repack or replace valves resulting in lost production and unnecessary downtime. Leaks can cause environmental damage and safety issues. Steam leaks can scald and even kill workers. The Environmental Protection Agency (EPA) is concerned about pollution resulting from leaky valve stem seals in factories and oil fields. In extreme cases, such as semiconductor manufacturing, even microscopic leaks can be fatal—breathing tanks and hazmat suits are often used to clean up after leaks are detected in semiconductor foundries.

Most traditional valves usually have two moving seals: (1) the Seat where the flow of material through the valve is allowed, controlled, and shut off, and (2) the Stem seal that keeps the material from leaking out of the hole for the valve handle. Studies have shown that some high percentage of the leaks encountered in real world valves are associated with the stem seals because they tend to entrain dirt and grit which can erode the mating surfaces over time.

Traditional valves contain stem seals that often degrade or leak over time. Previous seal-less valves often employed bending or flexing components such as bellows or membranes that can degrade or fatigue and also leak long term. Additionally, previous generations of magnetic valves usually contained internal magnets making high temperature operation difficult to achieve, as high temperatures can cause ferromagnetic materials inside valves to lose their magnetic properties.

SUMMARY

Systems and methods are provided for magnet-actuated linearly actuating valves where the stem slides in through the stem seal with external magnets and internal magnetic flux paths.

In accordance with various embodiments of the present invention, a valve assembly is generally described. In some examples, the valve assembly may comprise a valve bonnet defining an enclosure. In at least some examples, a movable valve member may be disposed in the enclosure. In some examples, a stem (e.g., a valve stem) may be disposed in the enclosure and may be operatively coupled to the movable valve member. In various examples, a first internal ferromagnetic actuation member may be coupled to the valve stem. In at least some examples, a second internal ferromagnetic actuation member may be coupled to the valve stem. In some cases, the first internal ferromagnetic actuation member and the second internal ferromagnetic actuation member may be disposed in a spaced relationship along the valve stem. In various examples, an external actuator may be slidably engaged to an exterior surface of the valve bonnet. In various further examples, the external actuator may comprise a first magnet magnetically coupled to the first internal ferromagnetic actuation member through the valve bonnet, and/or a second magnet magnetically coupled to the second internal ferromagnetic actuation member through the valve bonnet. In at least some cases, the external actuator may be effective to slide along the valve bonnet in a first direction causing a first force to be exerted on the first internal ferromagnetic actuation member and a second force to be exerted on the second internal ferromagnetic actuation member in the first direction. The first force and the second force may be effective to cause the movable valve member to close the valve. In at least some other examples, the external actuator may be effective to slide along the valve bonnet in a second direction causing a third force to be exerted on the first internal ferromagnetic actuation member and a fourth force to be exerted on the second internal ferromagnetic actuation member in the second direction. In various examples, the third force and the fourth force may be effective to cause the movable valve member to open the valve.

In accordance with various other embodiments of the invention, methods of actuating valves are generally described. In various examples, the methods may comprise moving an external actuator slidably engaged to an exterior surface of a valve bonnet in a first direction. In at least some examples, the external actuator may include a first magnet magnetically coupled to a first internal ferromagnetic actuation member disposed within an enclosure formed by the valve bonnet, and a second magnet magnetically coupled to a second internal ferromagnetic actuation member through the valve bonnet. In at least some examples, moving the external actuator along the valve bonnet in the first direction may cause a first force to be exerted on the first internal ferromagnetic actuation member and a second force to be exerted on the second internal ferromagnetic actuation member in the first direction. In some cases, the first force and the second force may be effective to cause a movable valve member to close the valve. In various further examples, moving the external actuator in a second direction may cause a third force to be exerted on the first internal ferromagnetic actuation member and a fourth force to be exerted on the second internal ferromagnetic actuation member in the second direction. In at least some examples, the third force and the fourth force may be effective to cause the movable valve member to open the valve.

Still other embodiments of the present invention will become readily apparent to those skilled in the art from the following detailed description, which describes embodiments illustrating various examples of the invention. As will be realized, the invention is capable of other and different embodiments and its several details are capable of modifications in various respects, all without departing from the spirit and the scope of the present invention. Accordingly, the drawings and detailed description are to be regarded as illustrative in nature and not as restrictive.

DETAILED DESCRIPTION

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Various embodiments of the present disclosure provide improved systems and methods for actuating valves using an external magnet and internal magnetic flux path. These embodiments may provide improved durability and leakresistance, as well as overcoming various technical challenges presented when using conventional magnetic valves.

Figure 1B:
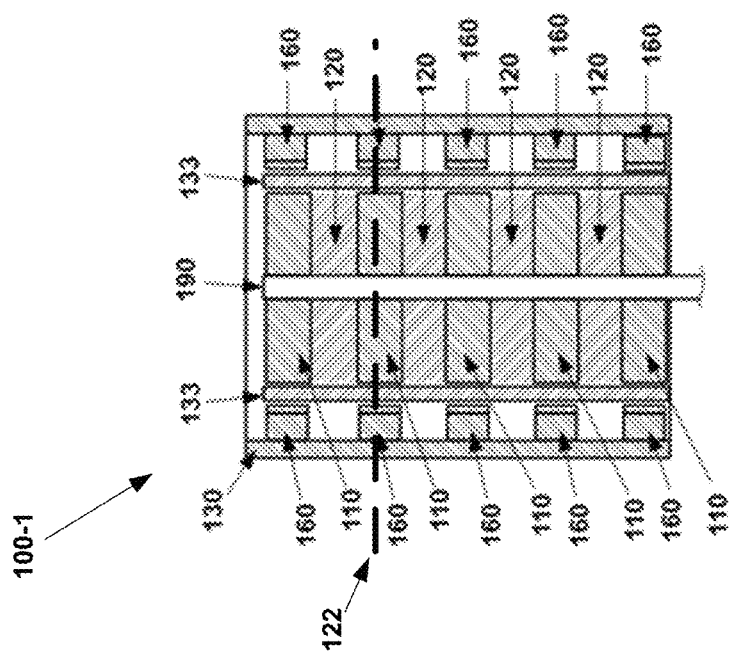
FIGS. 1A and 1B depict top-down and cut-away views, respectively, of a magnetic coupling suitable for transmitting linear sliding forces from the exterior to the interior of a linearly actuating sliding stem magnet-actuated valve, in accordance with some aspects of the present disclosure.
Figure 1A:
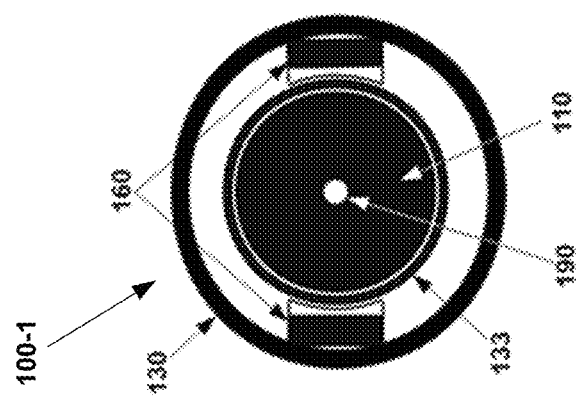

FIGS. 1A and 1B depict a portion of a valve assembly 100-1, in accordance with embodiments of the present invention. The valve assembly 100-1 utilizes a magnetic coupling suitable for transmitting linear forces from the exterior to the interior of a valve body and/or valve bonnet of a linearly-actuating sliding-stem magnet-actuated valve. FIG. 1A is a top view of this coupling where at least one magnet 160 (in various examples, magnet 160 may be a single magnet pole) transmits magnetic flux through bonnet 133, across the internal ferromagnetic actuation members 110, to another magnet 160 (or magnet pole). In various examples, bonnet 133 may comprise a body of the valve and may be fabricated from a non-ferromagnetic material. The bonnet 133 may be formed in such a way as to form an enclosure that contains internal ferromagnetic actuation members 110. An external actuator 130 (sometimes referred to herein as the back iron or external ferromagnetic actuator) may comprise a ferromagnetic material and may complete a magnetic circuit by conducting the magnetic flux from one magnet 160 to the other side or magnetic pole of the magnets (e.g., from one magnet 160 to another magnet 160). In various examples, a non-ferromagnetic external actuator may be used in place of the external actuator 130. For example, external actuator 130 may be fabricated from a non-ferromagnetic material, and may thus be non-ferromagnetic (apart from magnets 160). In such an example, the non-ferromagnetic external actuator may not complete the magnetic circuit and thus may generate a weaker actuation force during actuation of the valve relative to a ferromagnetic external actuator.

FIG. 1B is a cut-away side view of the actuator of FIG. 1A comprising a stack of five pairs of magnets 160 (although any number of magnets may be used in accordance with the desired implementation). In the example depicted in FIG. 1B, five internal ferromagnetic actuation members 110 are disposed within the bonnet 133. The internal ferromagnetic actuation members 110 may in some examples (e.g., where the actuator comprises a cylindrical bonnet 133) be formed in a flat disc shape and referred to herein as "pucks." In other embodiments, the internal ferromagnetic actuation members 110 may be formed in any suitable shape depending on the geometry of the bonnet 133 and/or valve body. Each pair of magnets 160 may be laterally aligned with a respective internal ferromagnetic actuation member 110. Non-ferromagnetic material 120 may be disposed between magnetically active layers (e.g., between internal ferromagnetic actuation members 110). However, in some examples, adjacent internal ferromagnetic actuation members 110 may be arranged in a spaced relationship along stem 190 (e.g., a valve stem). In various examples, non-ferromagnetic material 120 may fill the space between adjacent internal ferromagnetic actuation members 110. In at least some examples, non-ferromagnetic material 120 may comprise 316 Alloy Stainless steel, air, a working fluid, etc.

Figure 5:
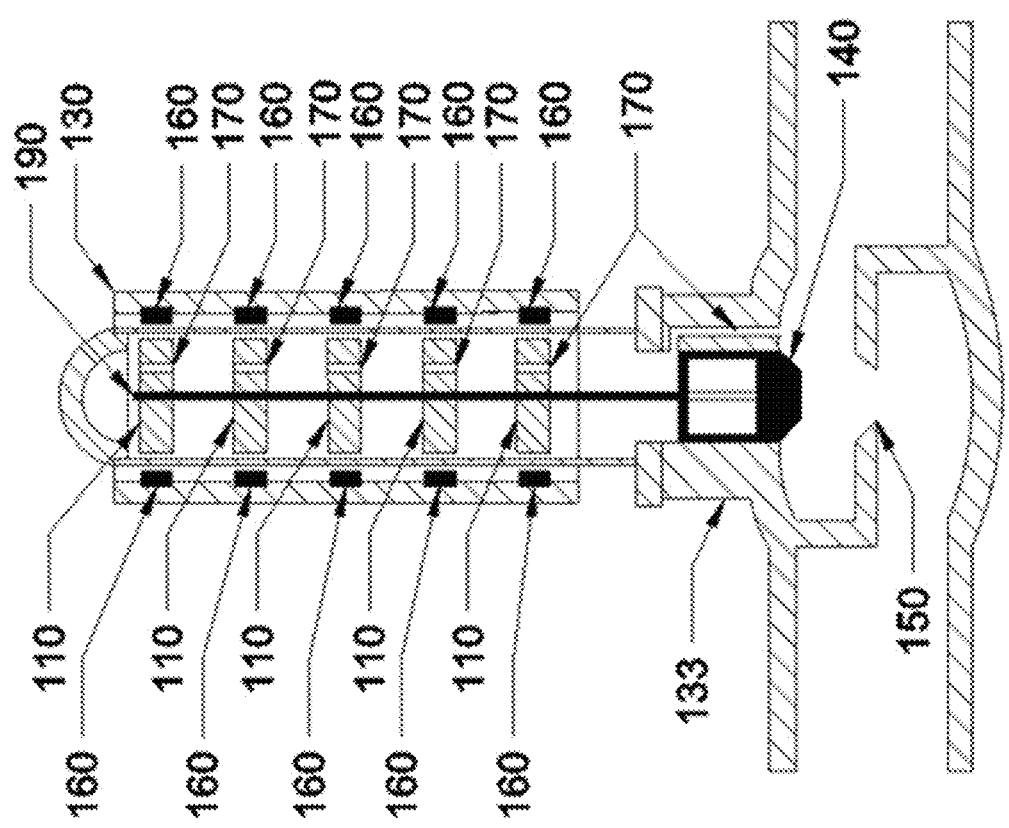
FIG. 5 depicts a cross-sectional side view of a magnet-actuated sliding stem globe valve in the open position, in accordance with some aspects of the present disclosure.

Stem 190 may be directly attached or otherwise rigidly coupled to at least some of ferromagnetic actuation members 110. Ferromagnetic actuation members 110 may act as an internal actuation member effective to transmit magnetic flux from a magnet 160, through a ferromagnetic actuation member 110, to a corresponding magnet 160 on the opposing lateral side of the structure (as depicted in FIG. 1B). Accordingly, the ferromagnetic actuation member 110 may complete a magnetic flux path 122 from one side of the actuator to the other, which then magnetically couples the magnets 160 and the actuation member 110. When the magnets 160 are magnetically coupled with the actuation members 110, vertical movement of the external actuator 130 causes the coupled actuation members 110 to translate vertically with the corresponding magnetically coupled magnets 160. Because the actuation members 110 are coupled to the stem 190, the vertical translation of the actuation members 110 thereby results in a corresponding vertical translation of the stem 190 and a movable valve member coupled to a distal end of the stem 190 (an example of a movable valve member is depicted in FIG. 5). For example, external actuator 130 may be configured to slide vertically along bonnet 133. When external actuator 130 slides in a downward direction (in the orientation depicted in FIG. 1B, the relative term "downward" indicates toward the lower end of the FIG. 1B), the magnets 160 exert a magnetic force in a downward direction on internal ferromagnetic actuation members 110 due to the magnetization of the internal ferromagnetic actuation members 110 by the corresponding magnets 160. As the internal ferromagnetic actuation members 110 may be directly attached (and/or otherwise coupled, as described below) to stem 190, the downward force on internal ferromagnetic actuation members 110 may cause the stem to move downward. As depicted in subsequent figures, the stem 190 may be coupled to a movable valve member that opens and closes the valve. In various examples, moving the stem 190 downward may cause the valve to be closed such that fluid is prevented from flowing through the valve.

Conversely, when external actuator 130 slides in an upward direction (in the orientation depicted in FIG. 1B), the magnets 160 may exert a magnetic force in an upward direction on internal ferromagnetic actuation members 110 due to the magnetization of the internal ferromagnetic actuation members 110 by the corresponding magnets. As the internal ferromagnetic actuation members 110 may be directly attached (and/or otherwise coupled, as described below) to stem 190, the upward force on internal ferromagnetic actuation members 110 may cause the stem to move upward. As depicted in subsequent figures, the stem 190 may be coupled to a movable valve member that may be used to open and close the valve. In various examples, moving the stem 190 upward may cause the valve to be opened.

Figure 2B:
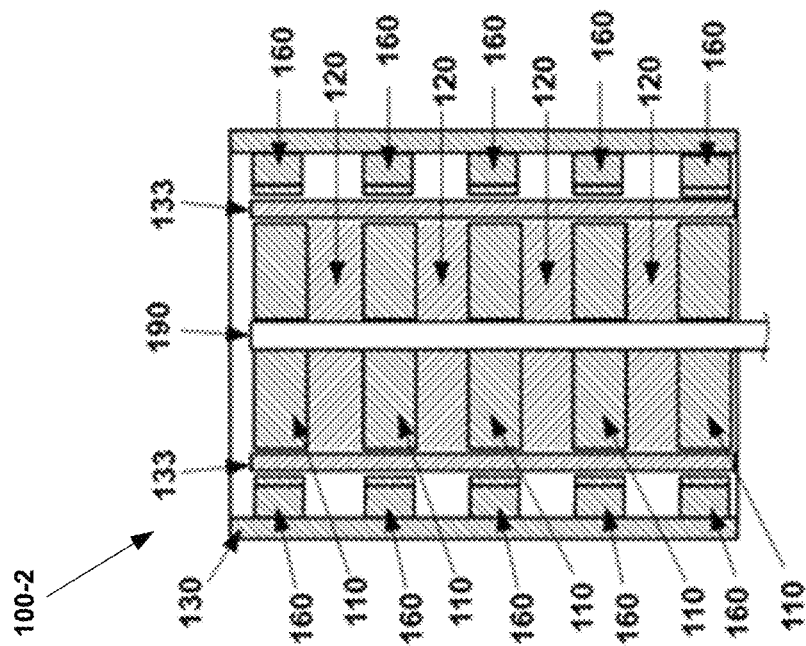
FIGS. 2A and 2B depict top-down and cut-away views, respectively, of a magnetic coupling with multiple magnets disposed adjacent to each level of the actuator suitable for transmitting linear sliding forces from the exterior to the interior of a linearly actuating sliding stem magnet-actuated valve, in accordance with some aspects of the present disclosure.
Figure 2A:
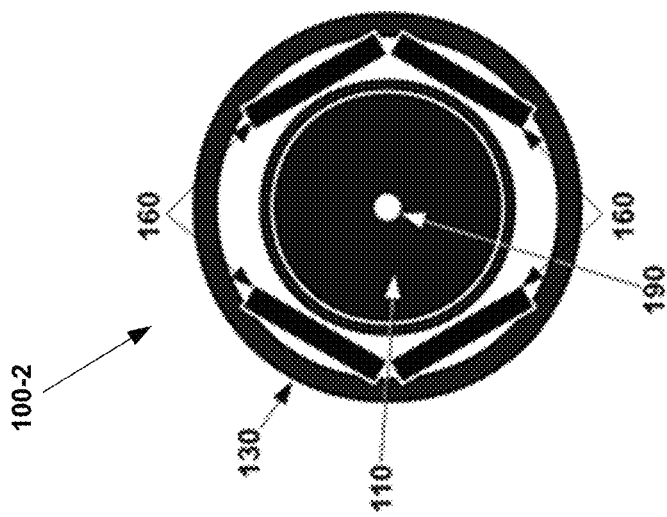

FIGS. 2A and 2B depict another embodiment of a valve assembly 100-2 utilizing a magnetic coupling with multiple magnets on each level of the actuator suitable for transmitting linear sliding forces from the exterior to the interior of a valve body or bonnet of a linearly-actuating sliding-stem magnet-actuated valve, in accordance with some aspects of the present disclosure. The additional magnets (e.g., four magnets 160 depicted in FIG. 2A) per layer of the actuator may result in higher forces being translated to the valve member for a given size, shape, and/or cost of the actuation mechanism. Those reference numbers used in FIGS. 2A and 2B that were previously used in to FIGS. 1A and 1B refer to similar components, the descriptions of which may be omitted in the description of FIGS. 2A and 2B for purposes of clarity and brevity. Although four magnets 160 (and/or magnetic poles) are depicted per layer of the external actuator 130 in FIG. 2A, any number of magnets may be employed in accordance with the desired implementation. Similarly, although five layers of magnets 160 are depicted in FIG. 2B, greater or fewer layers may instead be used, depending on the desired implementation. In various examples, using greater or fewer magnets per-layer and/or greater or fewer layers of magnets may be used to adjust the linear vertical actuation force used to seat and unseat the valve member (e.g., to close and open the valve). In general, adding additional layers of magnets (and/or additional numbers of magnets within a layer) permit the use of larger actuation forces during valve actuation before the magnets 160 magnetically decouple from the corresponding internal actuation members 110.

Figure 3B:
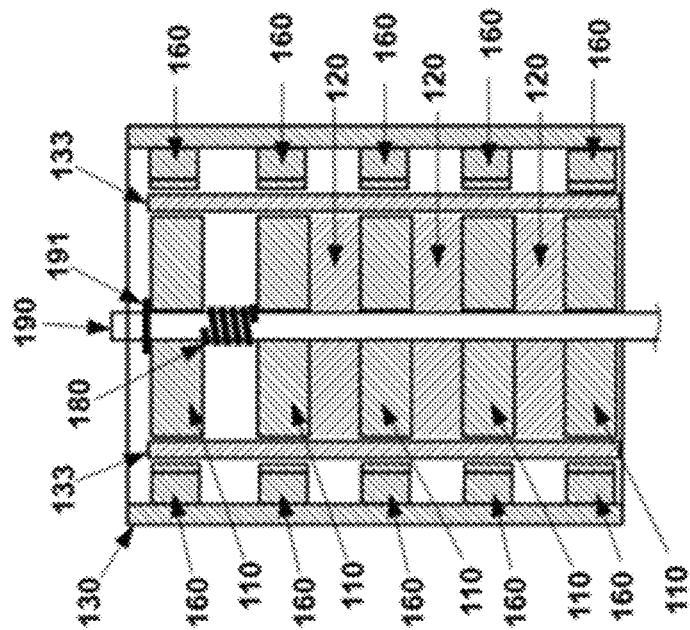
FIGS. 3A and 3B depict top-down and cut-away views, respectively, of a magnetic coupling that exhibits asymmetric forces depending on the direction of motion of the actuation suitable for transmitting linear sliding forces from the exterior to the interior of a linearly actuating sliding stem magnet-actuated valve, in accordance with some aspects of the present disclosure.
Figure 3A:
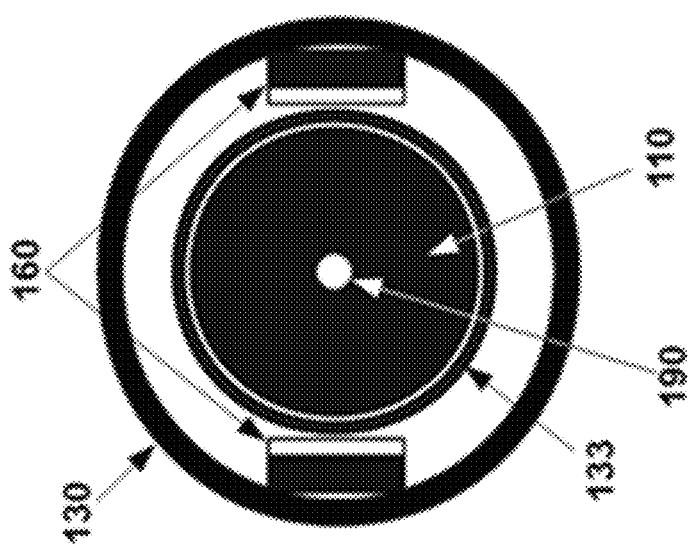

FIGS. 3A and 3B depict a magnetic coupling that exhibits asymmetric (different) forces depending on the direction of motion/actuation. In various examples, magnets 160 may include iron and/or another ferromagnetic material between the magnetic material and the bonnet 133. The actuators depicted in FIGS. 3A and 3B are suitable for transmitting linear sliding forces from the exterior to the interior of a valve body or bonnet 133 of a linearly actuating sliding stem magnet-actuated valve, in accordance with some aspects of the present disclosure. Those components in FIGS. 3A and 3B that have been described previously with reference to FIGS. 1A-1B and 2A-2B may not be described again for purposes of clarity and brevity.

In FIG. 3B, the top-most internal ferromagnetic actuation member 110 may not be directly affixed to stem 190, as it was in FIG. 1B and/or 2B. Instead, in FIG. 3B, the top-most internal ferromagnetic actuation member 110 may be held in place between a spring 180 and a pin 191. Spring 180 may be attached to a side (e.g., the lower side) of top-most internal ferromagnetic actuation member 110 and a side (e.g., the upper side) of the adjacent internal ferromagnetic actuation member 110 (e.g., the second-to-top-most internal ferromagnetic actuation member 110). In various other examples, spring 180 may not be attached to the internal ferromagnetic actuation members 110, but may instead be used as a separator between the internal ferromagnetic actuation members 110. In various examples, spring 180 may surround stem 190, as depicted in FIG. 3B.

When upward force is exerted on the external portion of the actuation mechanism (e.g., the portion including magnets 160 and external actuator 130) all five instances of internal ferromagnetic actuation member 110 may apply an upward force on stem 190. For example, the lower four instances of internal ferromagnetic actuation members 110 may be directly attached to stem 190. Accordingly, when the external magnets 160 that are disposed adjacent to a respective internal ferromagnetic actuation member 110 are moved upward the respective internal ferromagnetic actuation member 110 applies an upward force on the stem to which the internal ferromagnetic actuation member 110 is directly attached. The top-most internal ferromagnetic actuation member 110 may not be directly attached to stem 190 (e.g., the top-most internal ferromagnetic actuation member 110 may include a hole through which the stem 190 passes and may thus be slidably engaged with stem 190 so that stem 190 may slide through the hole). However, when the external magnets 160 adjacent to the top-most internal ferromagnetic actuation member 110 are moved upwards (in the example in FIG. 3B), the internal ferromagnetic actuation member 110 may move upward and may apply a force on pin 191. The pin 191 may be attached to stem 190. Accordingly, the upward force applied to pin 191 by the top-most internal ferromagnetic actuation member 110 may result in an equivalent force in the upward direction as the example shown in FIG. 1B wherein the top-most internal ferromagnetic actuation member 110 is directly attached to stem 190.

Conversely, in FIG. 3B, when downward force is applied to the external portion of the actuation mechanism (e.g., the portion including magnets 160 and external actuator 130), only the lower four instances of internal ferromagnetic actuation members 110 may act directly on stem 190. This is because the top-most internal ferromagnetic actuation member slides along the stem 190 due to it not being directly attached to stem 190. Only a small force is exerted by the top-most internal ferromagnetic actuation member 110 on the internal ferromagnetic actuation member 110 that is second from the top due to the spring 180. Accordingly, in the example depicted in FIG. 3B, the force resulting from actuation in the downward direction is slightly greater than 80% of the force achieved due to actuation in the upward direction. In various examples, such an asymmetric force may be used to free stuck valves when needed to open them (for example after long periods of inactivity), while limiting the downward seating force to a desired and/or specified seating force for the particular valve and/or application. In various examples, spring 180 may be used to prevent the two internal ferromagnetic actuation members 110 that are divided by spring 180 from becoming stuck together due to magnetic forces and/or due to entrained liquids and/or solids.

Figure 4B:
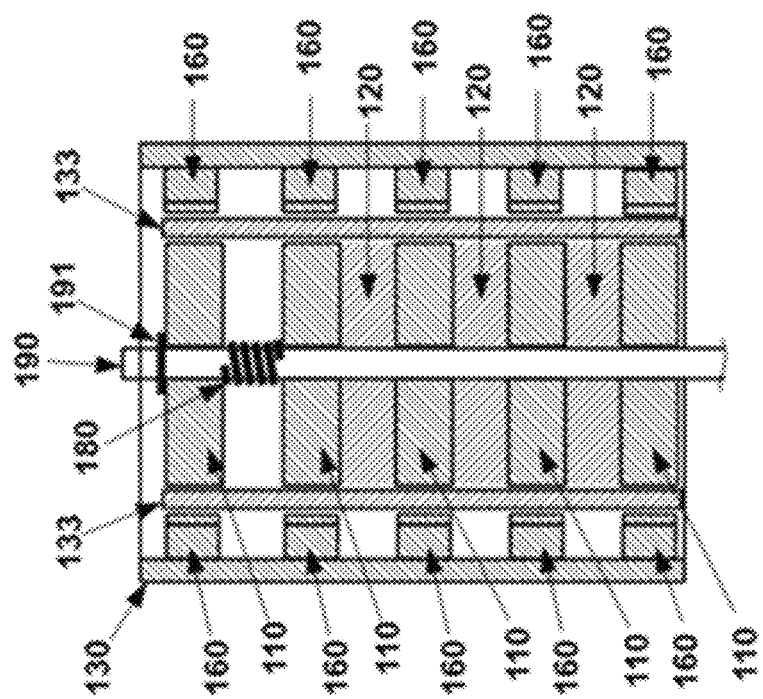
FIGS. 4A and 4B depict top-down and cut-away views, respectively, of a magnetic coupling that exhibits asymmetric forces depending on the direction of motion of actuation, including multiple magnets disposed adjacent to each level of the actuator, in accordance with some aspects of the present disclosure.
Figure 4A:
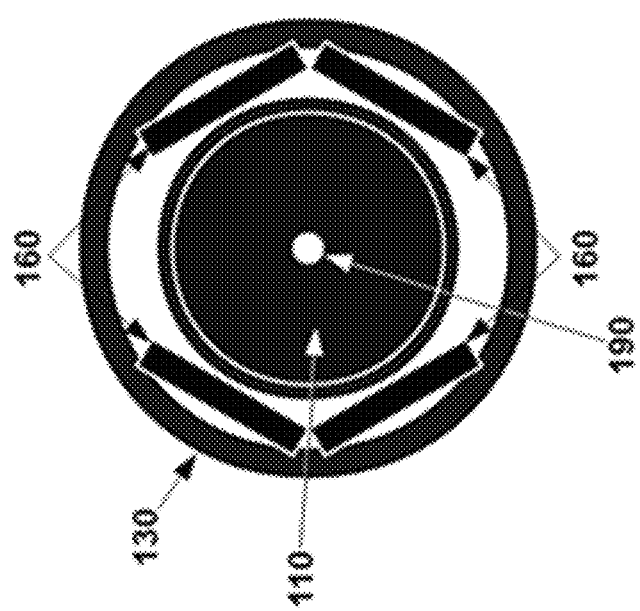

FIGS. 4A and 4B depict a magnetic coupling that exhibits both asymmetric and different forces depending on the direction of actuation (e.g., up or down in FIG. 4B) and has multiple magnets on each level of the actuator suitable for transmitting linear sliding forces from the exterior to the interior of a valve body or bonnet 133 of a linearly actuating sliding stem magnet-actuated valve, in accordance with some aspects of the present disclosure. Those components in FIGS. 4A and 4B that have been described previously with reference to FIGS. 1-3 may not be described again for purposes of clarity and brevity.

FIG. 5 depicts a cross-sectional side view of a magnet-actuated sliding-stem globe valve in the open position, in accordance with some aspects of the present disclosure. Those components in FIG. 5 that have been described previously with reference to FIGS. 1-4 may not be described again for purposes of clarity and brevity. The stem 190 may be attached and/or operatively coupled to the movable valve member 140. The movable valve member 140 may be translated in a linear manner into and out of the valve seat 150 during actuation of the sliding-stem globe valve of FIG. 5. In FIG. 5, the sliding-stem globe valve is depicted in the open position with movable valve member 140 held above valve seat 150 by stem 190. In various examples, vent holes 170 may be formed in bonnet 133 and/or in the internal ferromagnetic actuation members 110 in order to allow fluid to move more freely through vent holes 170 and to reduce fluid drag upon the moving portions of the valve mechanism and actuator. In the example depicted in FIG. 5, the external portion of the actuator (e.g., the portion including magnets 160 and external actuator 130) may slidably engage with the valve bonnet. During actuation, the external portion of the actuator may be moved downward (at least in the orientation shown in FIG. 5) in order to seat the movable valve member 140 in valve seat 150 to close the valve. Conversely, the external portion of the actuator may be moved upward in order to un-seat the movable valve member 140 from valve seat 150 in order to open the valve and allow fluid to flow through the valve.

Figure 6:
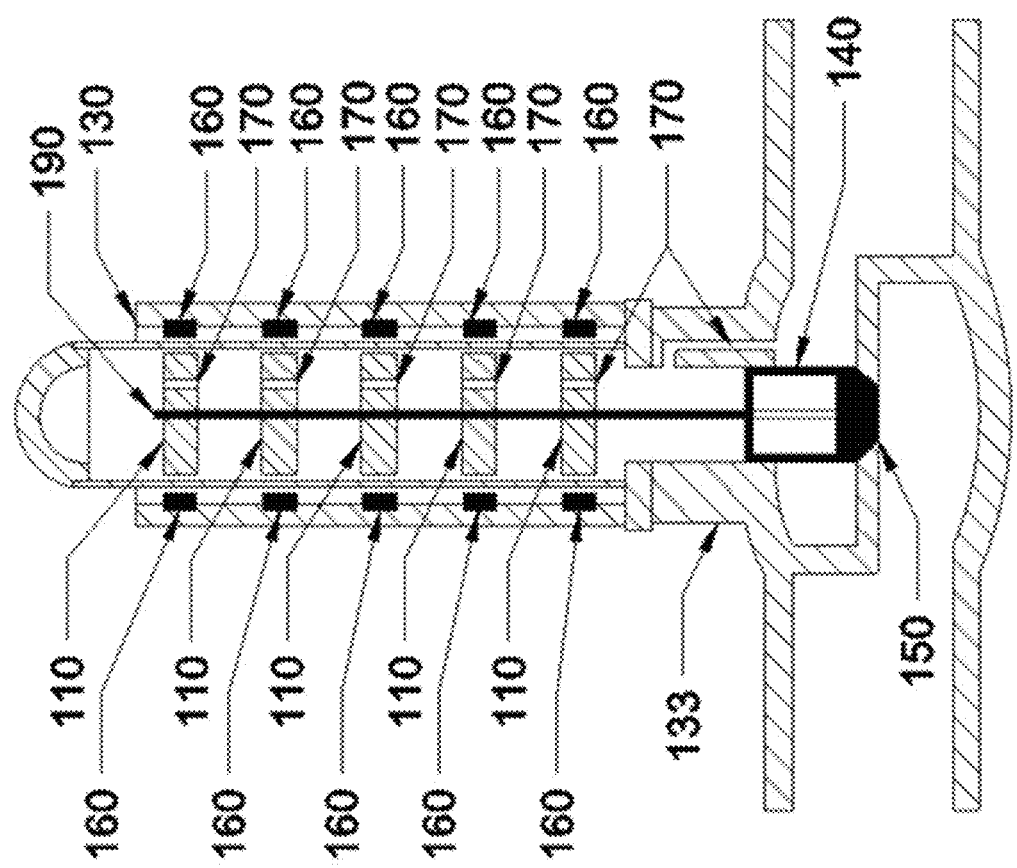
FIG. 6 depicts a cross-sectional side view of a magnet-actuated sliding stem globe valve in the closed position, in accordance with some aspects of the present disclosure.

FIG. 6 depicts a cross-sectional side view of the magnet-actuated sliding stem globe valve of FIG. 5 in the closed position, in accordance with some aspects of the present disclosure. Those components in FIG. 6 that have been described previously with reference to FIGS. 1-5 may not be described again for purposes of clarity and brevity. In FIG. 5, the valve enclosed by bonnet 133 is shown in the closed position with valve member 140 held against valve seat 150 by stem 190.

Figure 7:
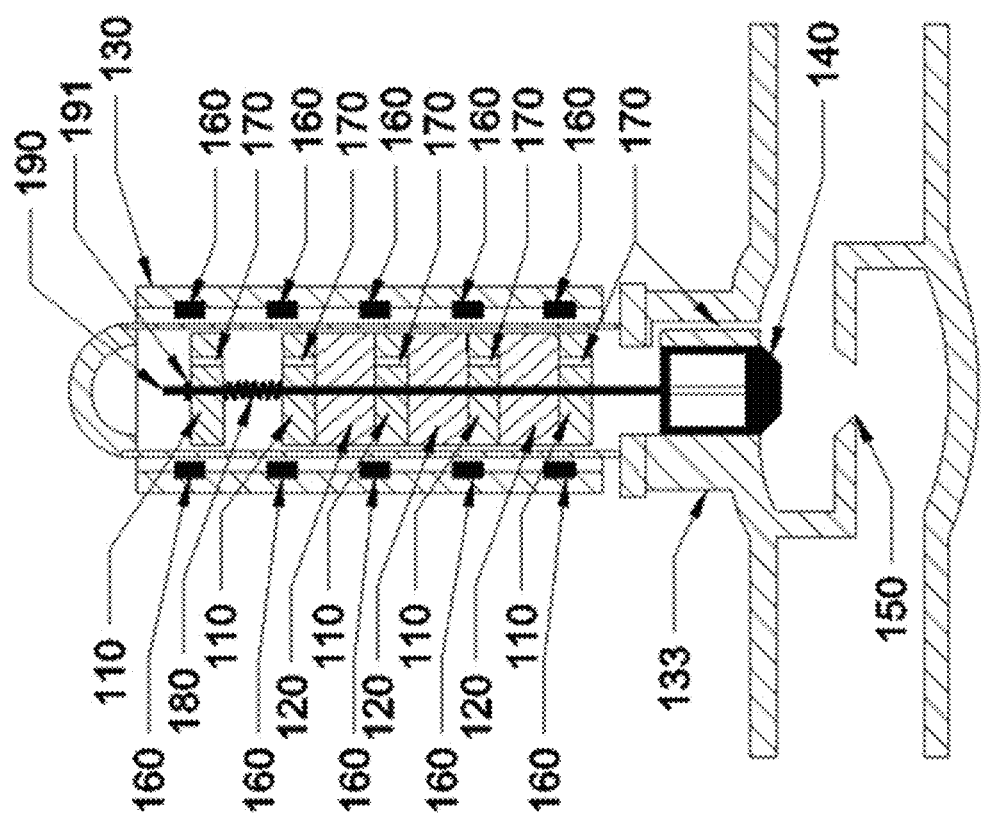
FIG. 7 depicts a cross-sectional side view of a magnet-actuated sliding stem globe valve in the open position that exhibits asymmetric forces depending on the direction of actuation, in accordance with some aspects of the present disclosure.

FIG. 7 depicts a cross-sectional side view of a magnet-actuated sliding-stem globe valve in the open position, in accordance with some aspects of the present disclosure. The actuation mechanism of the valve depicted in FIG. 7 may generate asymmetric forces depending on the direction of actuation (e.g., actuation from the open position to the closed position producing a first force, and actuation from the closed position to the open position producing a second, different force). Those components in FIG. 7 that have been described previously with reference to FIGS. 1-6 may not be described again for purposes of clarity and brevity.

In the valve depicted in FIG. 7, the top-most instance of the internal ferromagnetic actuation member 110 may not be directly affixed to stem 190, but instead may be held in place between spring 180 and pin 191. Accordingly, as previously described, when upward force is exerted on the external portion of the actuation mechanism (e.g., on external actuator 130), the external magnets 160 may rise higher than the internal ferromagnetic actuation members 110 (as depicted in FIG. 7). Accordingly, all five instances of internal ferromagnetic actuation members 110 may exert a force on stem 190. The top instance of internal ferromagnetic actuation member 110 may exert a force on pin 191. Pin 191 may be directly attached to the stem 190. Accordingly, exerting the upward force on pin 191 may result in the same force in the upward direction as though the top-most internal ferromagnetic actuation member 110 was attached to the stem during actuation.

Figure 8:
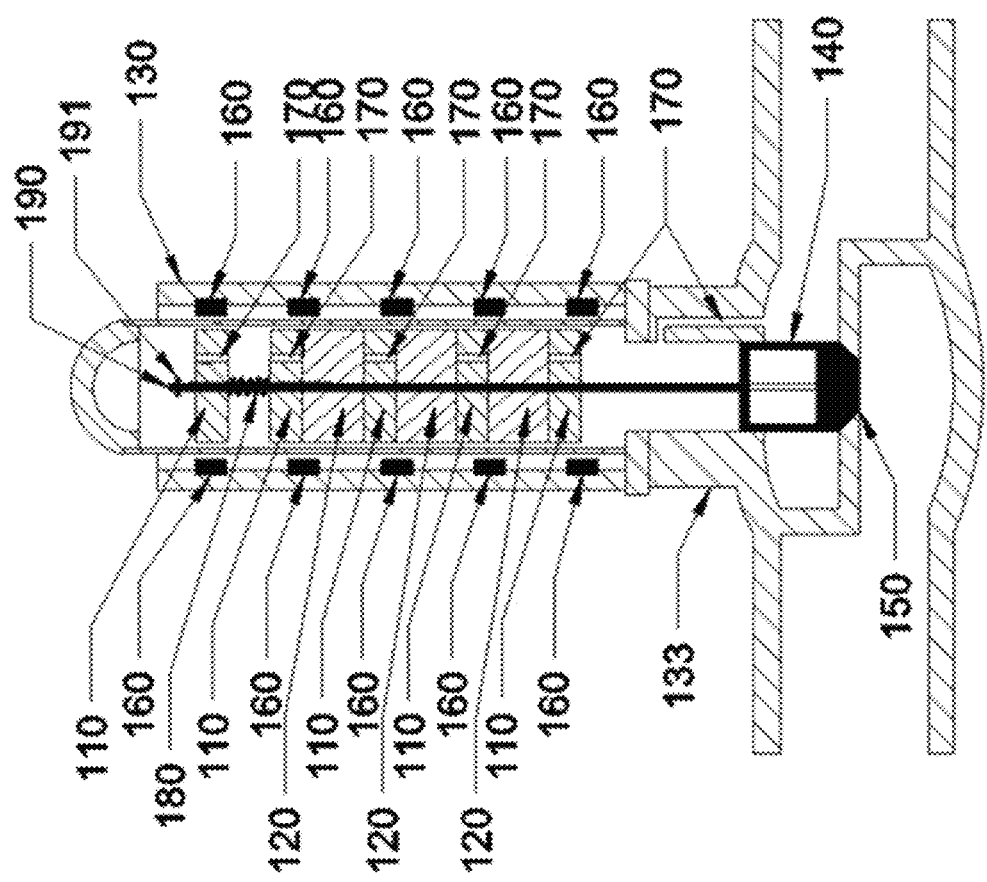
FIG. 8 depicts a cross-sectional side view of a magnet-actuated sliding stem globe valve in the closed position that exhibits asymmetric forces depending on the direction of actuation, in accordance with some aspects of the present disclosure.

FIG. 8 depicts a cross-sectional side view of the magnet-actuated sliding stem globe valve of FIG. 7 in the closed position, in accordance with some aspects of the present disclosure. Those components in FIG. 8 that have been described previously with reference to FIGS. 1-7 may not be described again for purposes of clarity and brevity. In FIG. 8, when downward force is applied to the external portion of the actuation mechanism (e.g., on external actuator 130), the external magnets Items 160 descend lower than the internal ferromagnetic actuation members 110, as shown. However, only the lower four instances of internal ferromagnetic actuation members 110 are directly attached to stem 190 and thus generate a downward force on stem 190. The top-most internal ferromagnetic actuation member 110 does not generate the same downward force on stem 190. Accordingly, in FIG. 8, the top-most pair of magnets 160 are aligned with the top-most internal ferromagnetic actuation member 110. This is because the top-most internal ferromagnetic actuation member slides along the stem 190 due to it not being directly attached to stem 190. Only a small force is exerted by the top-most internal ferromagnetic actuation member 110 on the internal ferromagnetic actuation member 110 that is second from the top. This small force is exerted by the spring 180. Accordingly, in the example depicted in FIG. 8, the force resulting from actuation in the downward direction is slightly greater than 80% of the force achieved due to actuation in the upward direction (FIG. 7). In various examples, such an asymmetric force may be used to free stuck valves when needed to open them (for example after long periods of inactivity), while limiting the seating force to a desired and/or specified seating force for the particular valve and/or application. In various examples, spring 180 may be used to prevent the two internal ferromagnetic actuation members 110 that are divided by spring 180 from becoming stuck together due to magnetic forces and/or due to entrained liquids and/or solids. Additionally, the seating force of the actuation mechanism may be limited to a specified and/or recommended seating force for the particular type of valve (e.g., through selection of the magnets 160 and/or the number of layers of magnets 160 and internal ferromagnetic actuation members 110). Further, as previously described, in various examples, the internal ferromagnetic actuation member 110 that is slidably engaged with stem 190 may be in a different position apart from what is shown in FIG. 8. For example, the slidably engaged internal ferromagnetic actuation member 110 may be other than the top-most internal ferromagnetic actuation member 110, in various implementations.

Figure 9:
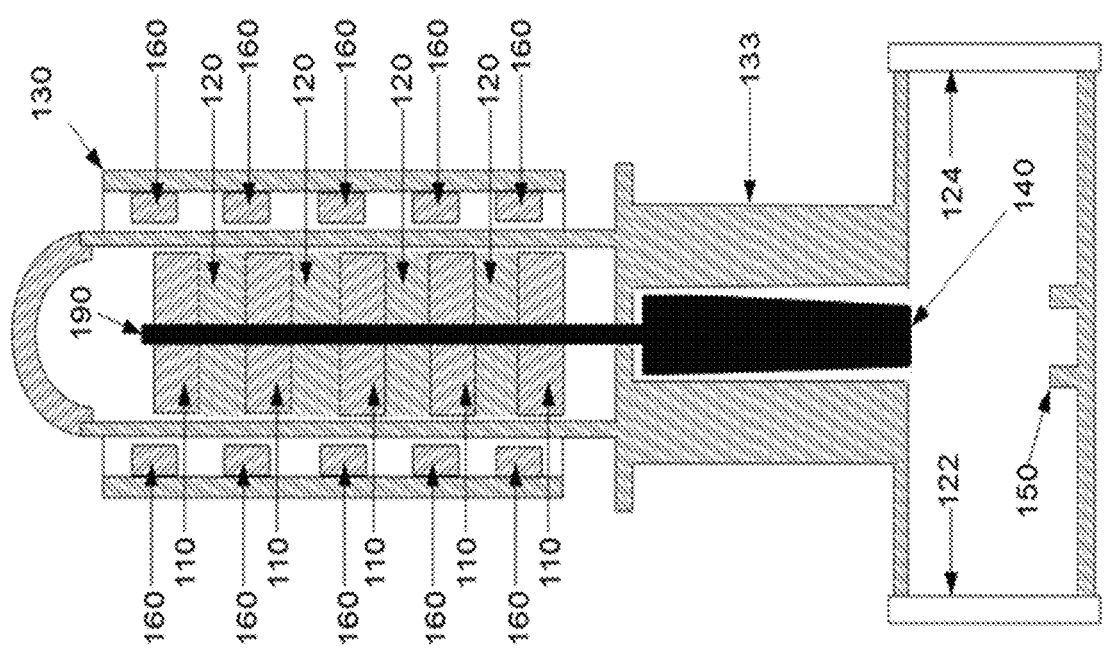
FIG. 9 depicts a cross-sectional side view of a magnet-actuated sliding stem gate valve in the open position, in accordance with some aspects of the present disclosure.

FIG. 9 depicts a cross-sectional side view of a magnet-actuated sliding stem gate valve in the open position, in accordance with some aspects of the present disclosure. In FIG. 9, the body of the valve (e.g., the bonnet 133) may be formed so as to include a first port 122 and a second port 124 through which fluid may flow when the movable valve member 140 is in the open position (as shown in FIG. 9). Fluid may be prevented from flowing between first port 122 and second port 124 when movable valve member 140 is seated in valve seat 150 (e.g., when the valve is in the closed position).

Figure 10:
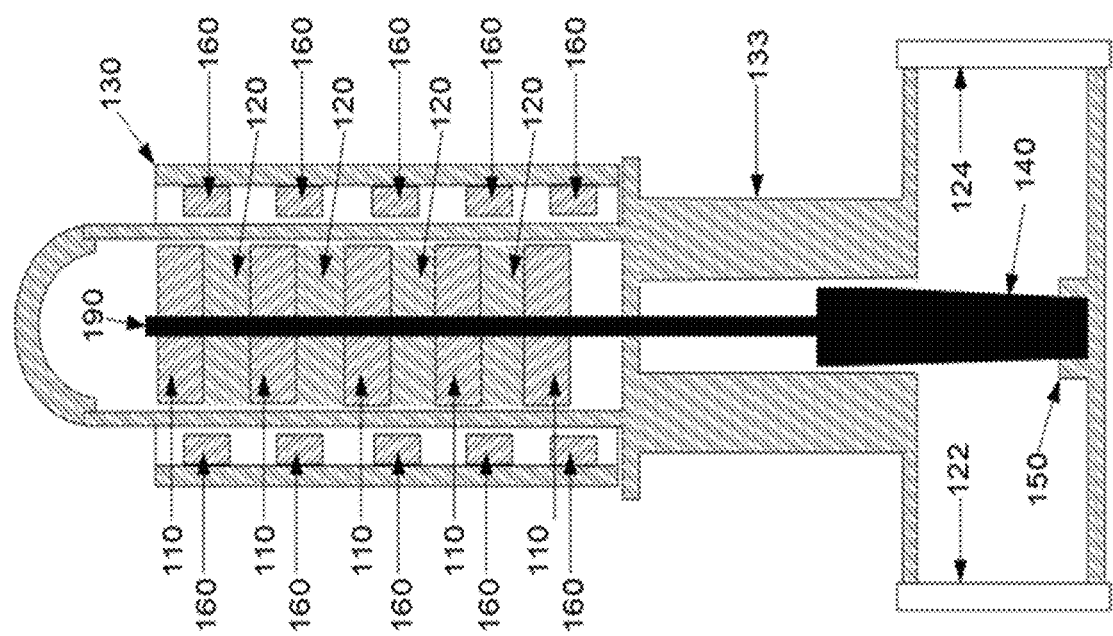
FIG. 10 depicts a cross-sectional side view of a magnet-actuated sliding stem gate valve in the closed position, in accordance with some aspects of the present disclosure.

FIG. 10 depicts a cross-sectional side view of the magnet-actuated sliding stem gate valve of FIG. 9 in the closed position.

Figure 11:
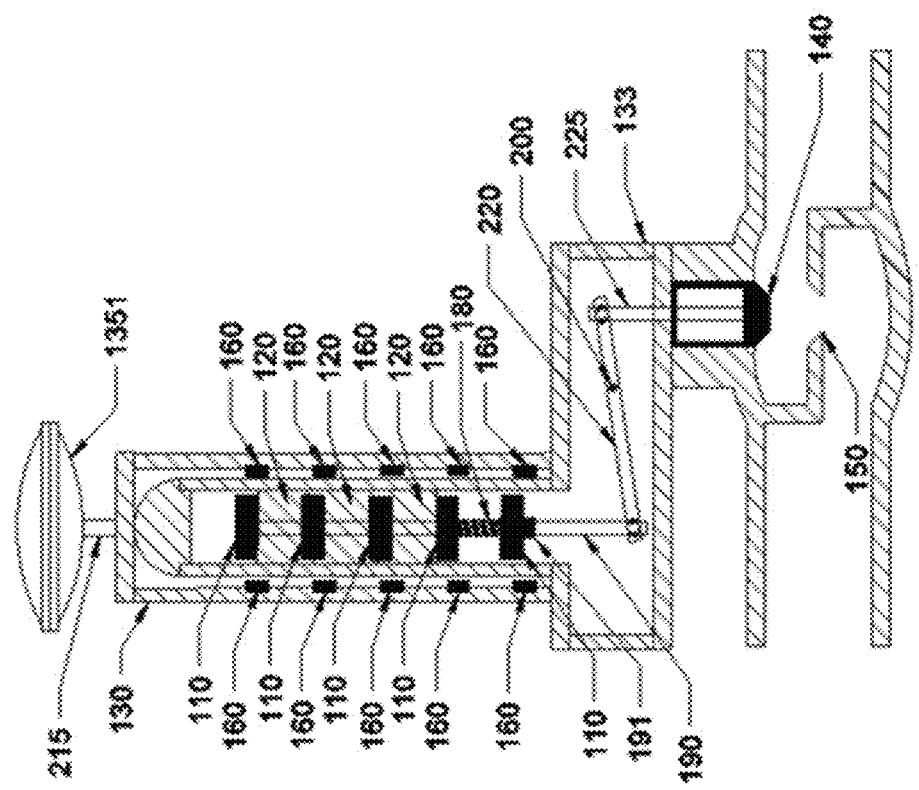
FIG. 11 depicts a cross-sectional side view of a magnet-actuated sliding stem globe valve in the open position, the valve including an internal lever mechanism and an external pneumatic valve actuator, in accordance with some aspects of the present disclosure.

FIG. 11 depicts a cross-sectional side view of a magnet-actuated sliding stem globe valve in the open position that exhibits asymmetric forces depending on the direction of actuation, in accordance with various aspects of the present disclosure. In the example valve depicted in FIG. 11, an internal lever mechanism 220 is disposed internal to the valve body (e.g., within an enclosure formed by bonnet 133) that may increase the force on the valve stem 225 relative to that on the valve stem 190 (e.g., the portion of the valve stem coupled to internal ferromagnetic actuation members 110). The lever mechanism may rotate around pivot 200. In the example valve depicted in FIG. 11, an external pneumatic valve actuator 1351 is coupled to the external actuator 130). Actuator stem 215 may be coupled to the external pneumatic valve actuator 1351 and/or the external actuator 130. Similarly, stem 225 may be coupled to the movable valve member 140.

Figure 12:
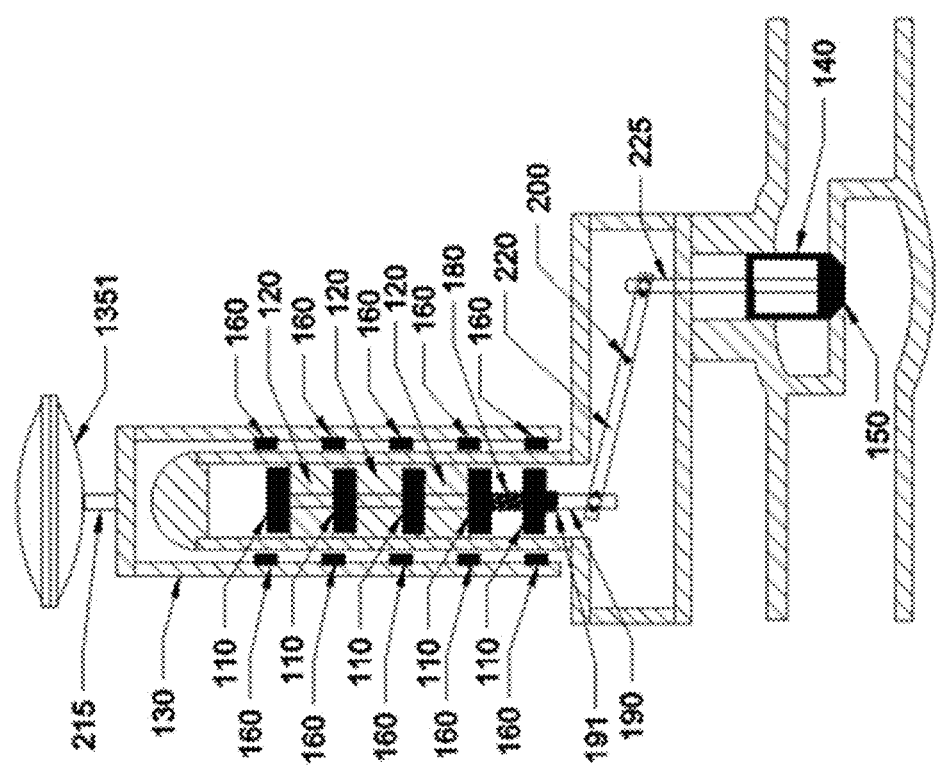
FIG. 12 depicts the valve of claim 11 in the closed position, in accordance with some aspects of the present disclosure.

FIG. 12 depicts a cross-sectional side view of the magnet-actuated sliding stem globe valve of claim 11 in the closed position, in accordance with various aspects of the present disclosure. As previously described, the actuator of the valve in FIGS. 11 and 12 may exhibit asymmetric actuation forces depending on whether the movable valve member 140 is being opened or closed. In the example of FIGS. 11 and 12, the bottom-most internal ferromagnetic actuation member 110 may be slidably engaged along stem 190 such that movement of the bottom-most internal ferromagnetic actuation member 110 exerts a force on stem 190 by way of pushing against pin 191 when the valve is being opened. When the valve is being closed the bottom-most internal ferromagnetic actuation member 110 exerts an upward force on stem 190 only by way of spring 180. Accordingly, the magnetic actuation mechanism of the valves in FIGS. 11 and 12 exerts a greater force on the movable valve member when opening the valve relative to closing the valve.

Figure 13:
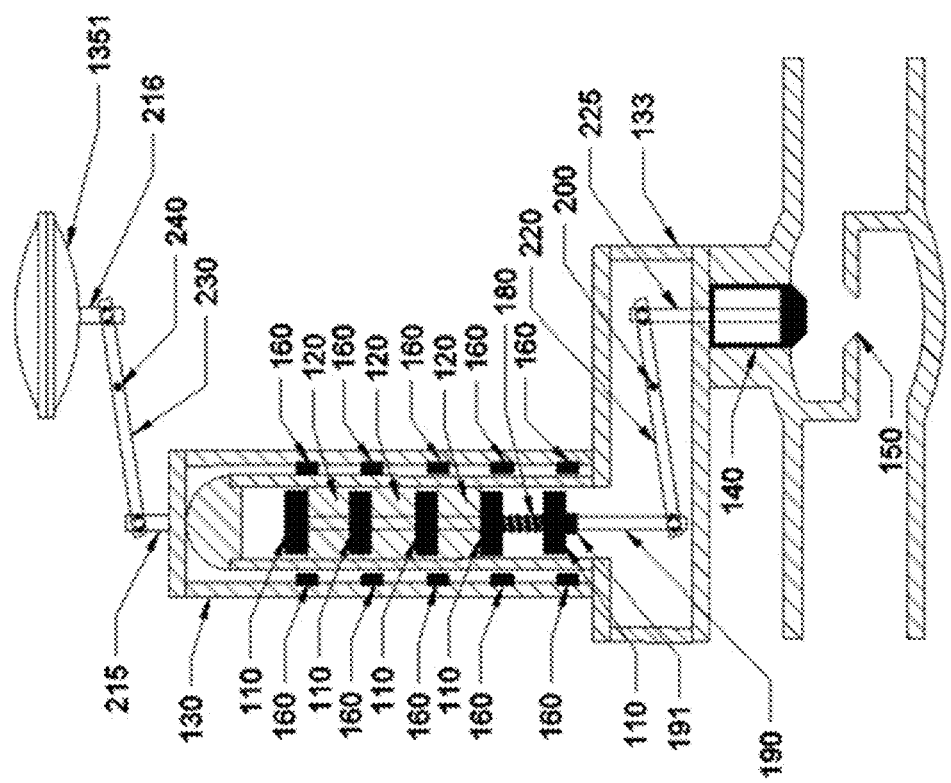
FIG. 13 depicts a cross-sectional side view of a magnet-actuated sliding stem globe valve in the open position that exhibits asymmetric forces depending on the direction of actuation, in accordance with some aspects of the present disclosure.

FIG. 13 depicts a cross-sectional side view of a magnet-actuated sliding stem globe valve in the open position that exhibits asymmetric forces depending on the direction of actuation, in accordance with some aspects of the present disclosure. In various examples, the valve of FIG. 13 may comprise an external mechanism, such as lever mechanism 230 pivoting around a lever pivot (e.g., external gear pivot 240). The lever mechanism 230 may increase the range of motion of the magnetic coupling, while decreasing the force used to actuate the magnetic actuator (e.g., decrease the force used to move external actuator 130). Additionally, the valve of FIG. 13 may comprise an internal mechanism (e.g., internal lever mechanism 220) rotating around pivot 200. The internal lever mechanism 220 may be effective to increase the force on the movable valve member 140 relative to the force on the magnetic coupling, thereby compensating for the external decrease in force on the magnetic coupling. In various examples, the internal and/or external levers and/or other gearing may allow magnetic valves to match actuation characteristics of legacy valves in order to offer equivalent performance. Stem 215 may be coupled to the external actuator 130 and stem 216 may be coupled to the pneumatic actuator 1351.

Figure 14:
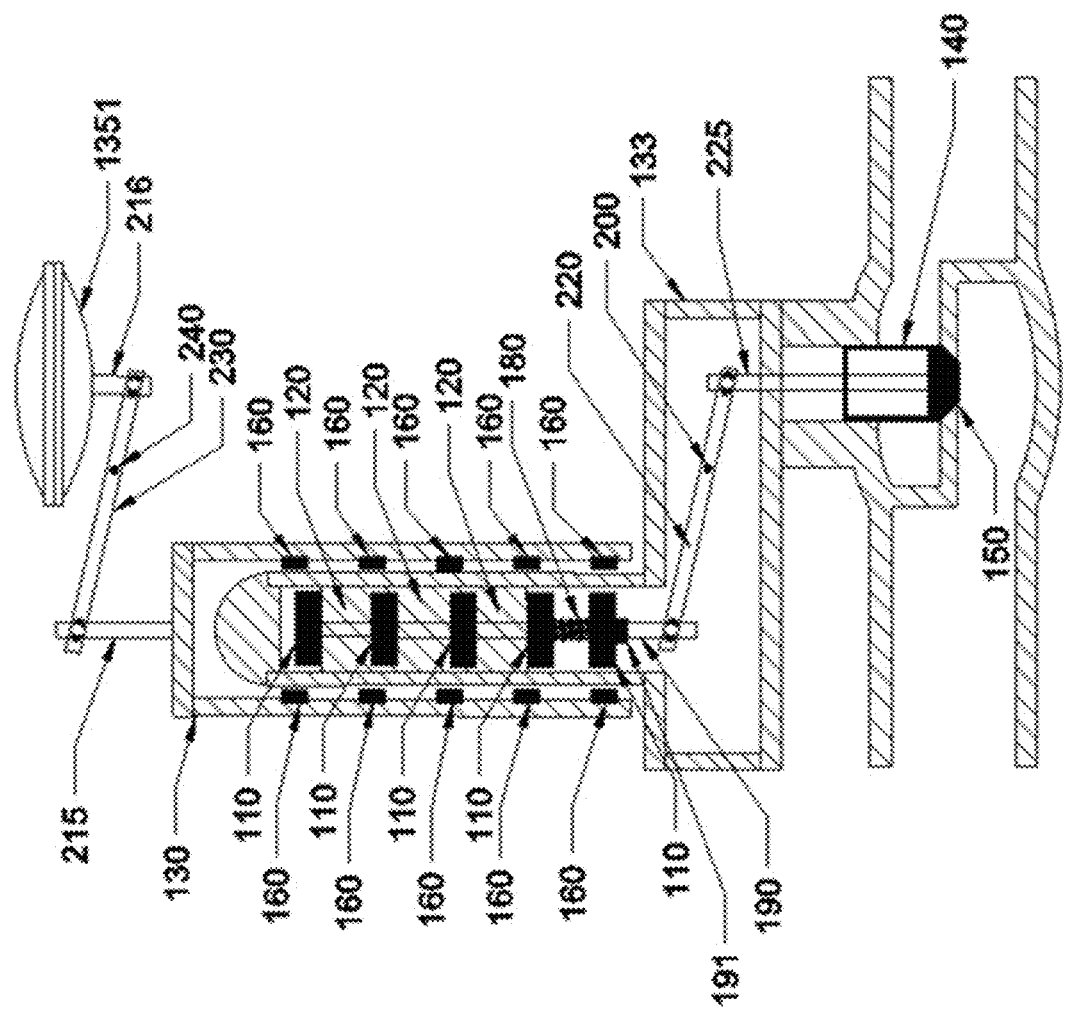
FIG. 14 depicts the valve of claim 13 in the closed position, in accordance with some aspects of the present disclosure.

FIG. 14 depicts a cross-sectional side view of the magnet-actuated sliding stem globe valve of FIG. 13 in the closed position. As previously described, the actuator may exhibit an asymmetric force depending on the direction of actuation due to at least one internal ferromagnetic actuation member 110 being slidably engaged with stem 190 (while other internal ferromagnetic actuation members 110 may be directly attached to stem 190). In the example depicted in FIGS. 13 and 14 the bottom-most internal ferromagnetic actuation member 110 may be slidably engaged with stem 190 while the remaining internal ferromagnetic actuation members 110 may be directly attached to stem 190.

Figure 15:
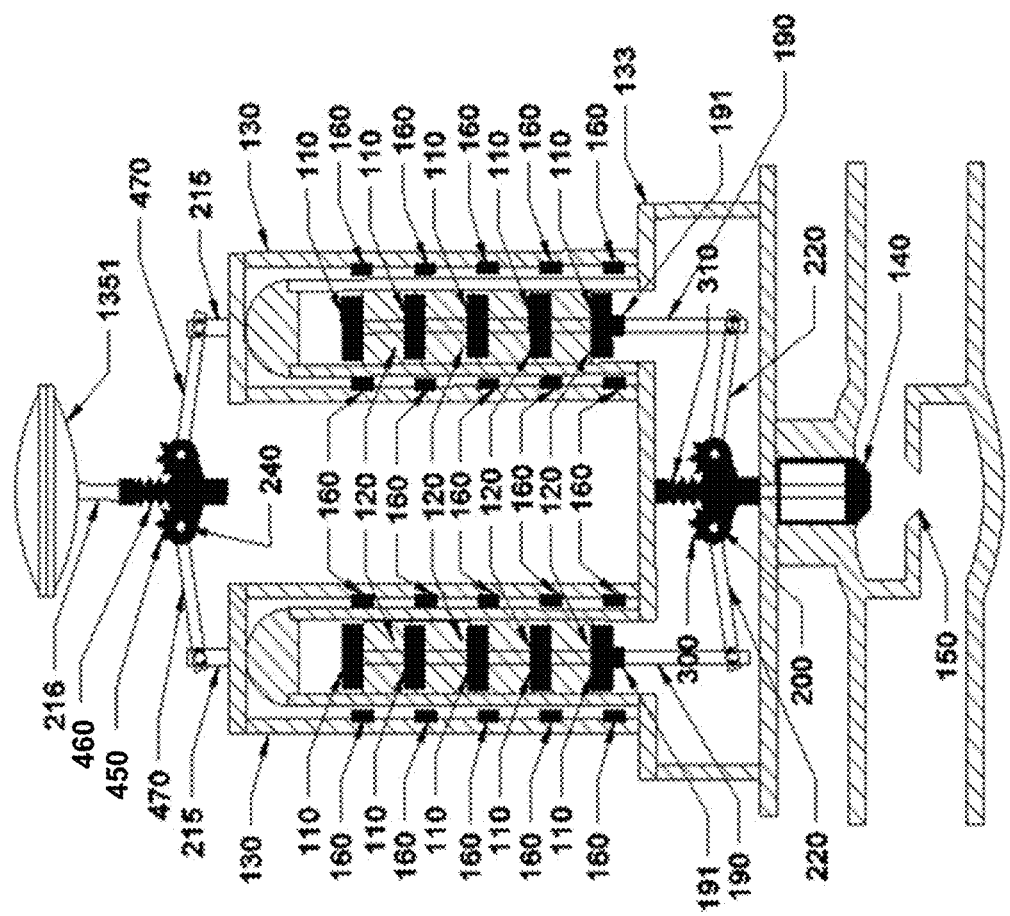
FIG. 15 depicts a cross-sectional side view of a magnet-actuated sliding stem globe valve in the open position, the valve including multiple magnetic couplings, geared lever mechanisms both internal and external to the valve body, and an external pneumatic valve actuator, in accordance with some aspects of the present disclosure.

FIG. 15 depicts a cross-sectional side view of a magnet-actuated sliding stem globe valve in the open position, the valve including multiple magnetic couplings, internal and external mechanisms (e.g., geared mechanisms both internal and external to the valve body), and an external pneumatic valve actuator, in accordance with some aspects of the present disclosure. In the example valve depicted in FIG. 15, two magnetic actuator stacks are included and internal (e.g., internal to the valve body/bonnet 133) and external gearing is used to adjust actuation forces. Although two stacks are depicted, any number of stacks may be used in accordance with the desired actuation force and/or the desired implementation. In various examples, each stack may be enclosed within a respective bonnet 133 and/or a separate segment of bonnet 133.

In the valve depicted in FIG. 15, a geared lever mechanism external to the valve body may include external rack 460 (e.g., threaded gearing of a rack and pinion assembly), external gear lever 470, external gear pivot 240, and external rack and pinion gear wheel 450. The external gearing may increase the range of motion of the magnetic coupling, while decreasing the force used to actuate the magnetic actuator (e.g., decrease the force used to move external actuator 130). Additionally, the valve of FIG. 15 may comprise internal gearing including internal rack and pinion gear wheel 300 and internal rack 310 rotating around pivot 200. The internal gearing may be effective to increase the force on the movable valve member 140 relative to the force on the magnetic coupling, thereby compensating for the external decrease in force on the magnetic coupling. In various examples, the internal and/or external levers and/or other gearing may allow magnetic valves to match actuation characteristics of legacy valves in order to offer equivalent performance. The valve in FIG. 15 depicts an external pneumatic valve actuator 1351 that may be used to actuate the valve. In various examples, hydraulic valve actuators may be used to actuate the various valves described herein, in accordance with the desired implementation.

Figure 16:
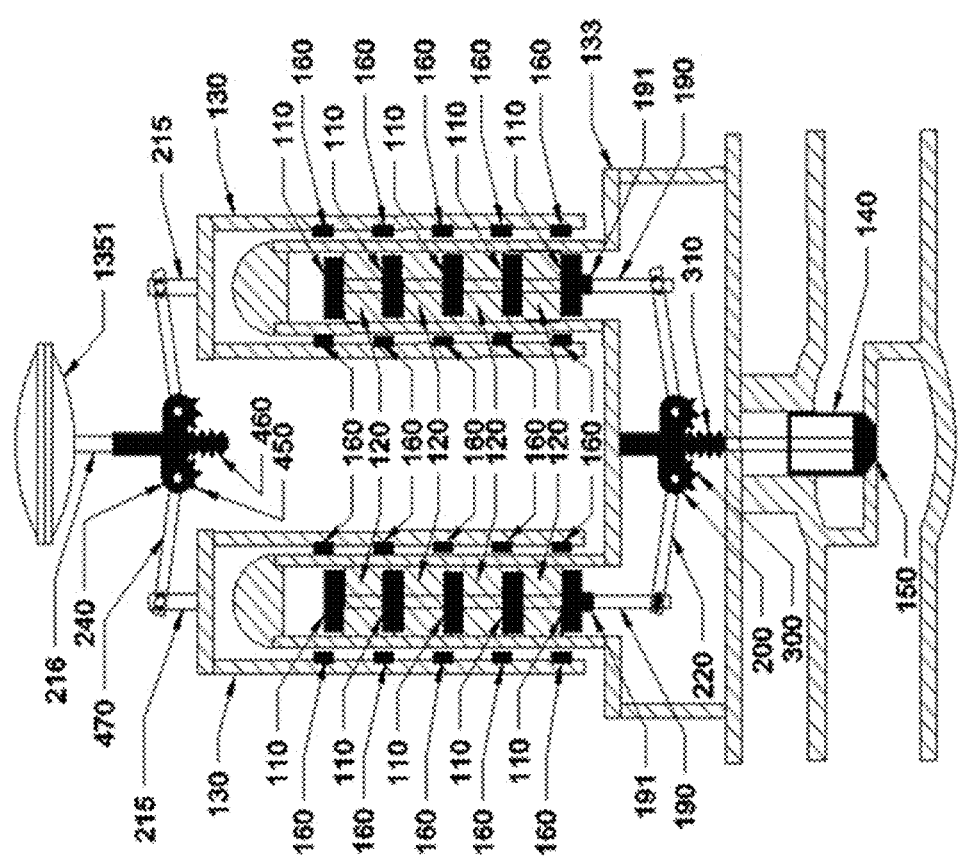
FIG. 16 depicts the valve of claim 15 in the closed position, in accordance with some aspects of the present disclosure.

FIG. 16 depicts the valve of claim 15 in the closed position, in accordance with some aspects of the present disclosure.

Figure 17:
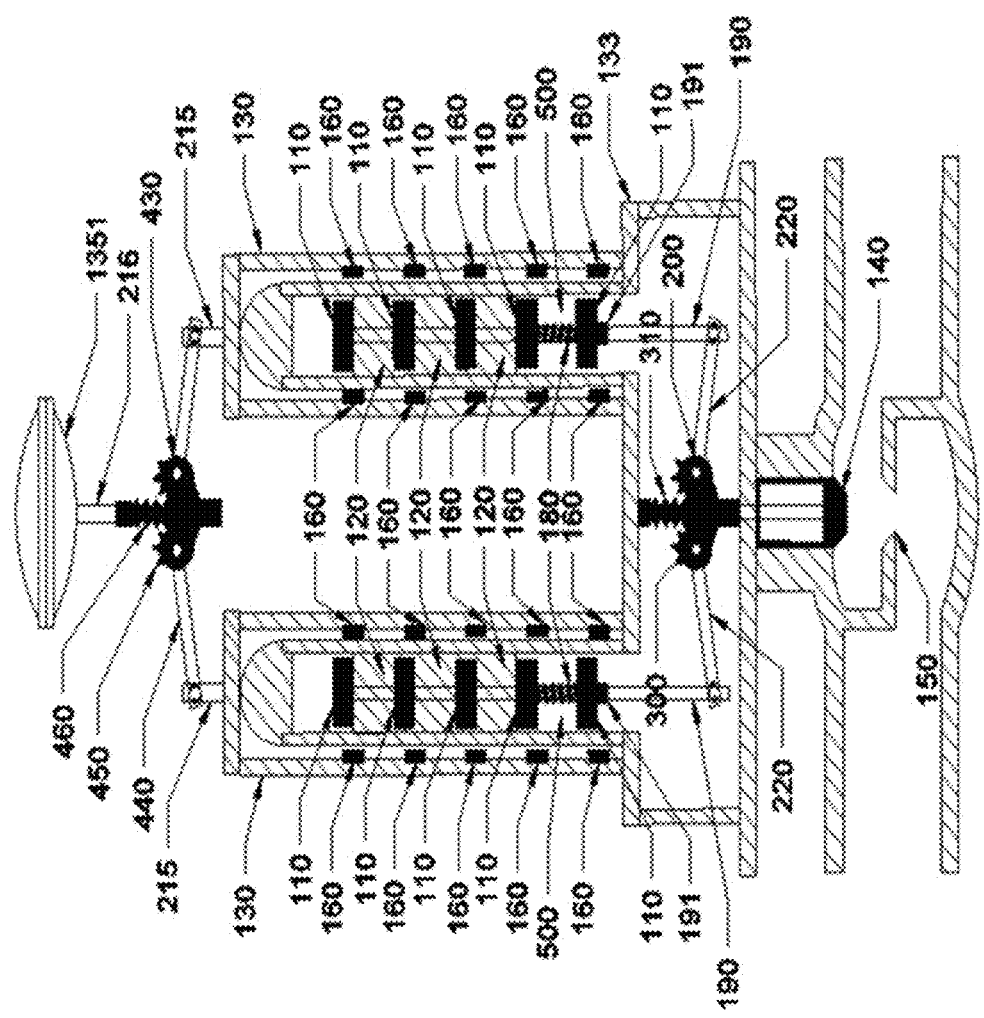
FIG. 17 depicts a cross-sectional side view of a magnet-actuated sliding stem globe valve in the open position that exhibits asymmetric forces depending on the direction of actuation, in accordance with some aspects of the present disclosure.

FIG. 17 depicts a cross-sectional side view of a magnet-actuated sliding stem globe valve in the open position that exhibits asymmetric forces depending on the direction of actuation, in accordance with some aspects of the present disclosure. The valve of FIG. 17 is similar to that of FIGS. 15-16, although the valve depicted in FIG. 17 includes at least one internal ferromagnetic actuation member 110 in each magnetic actuation stack that is slidably engaged with the respective stem 190. Internal springs 10 and pins 191 provide asymmetric actuation forces depending on the direction of actuation, as previously described.

Figure 18:
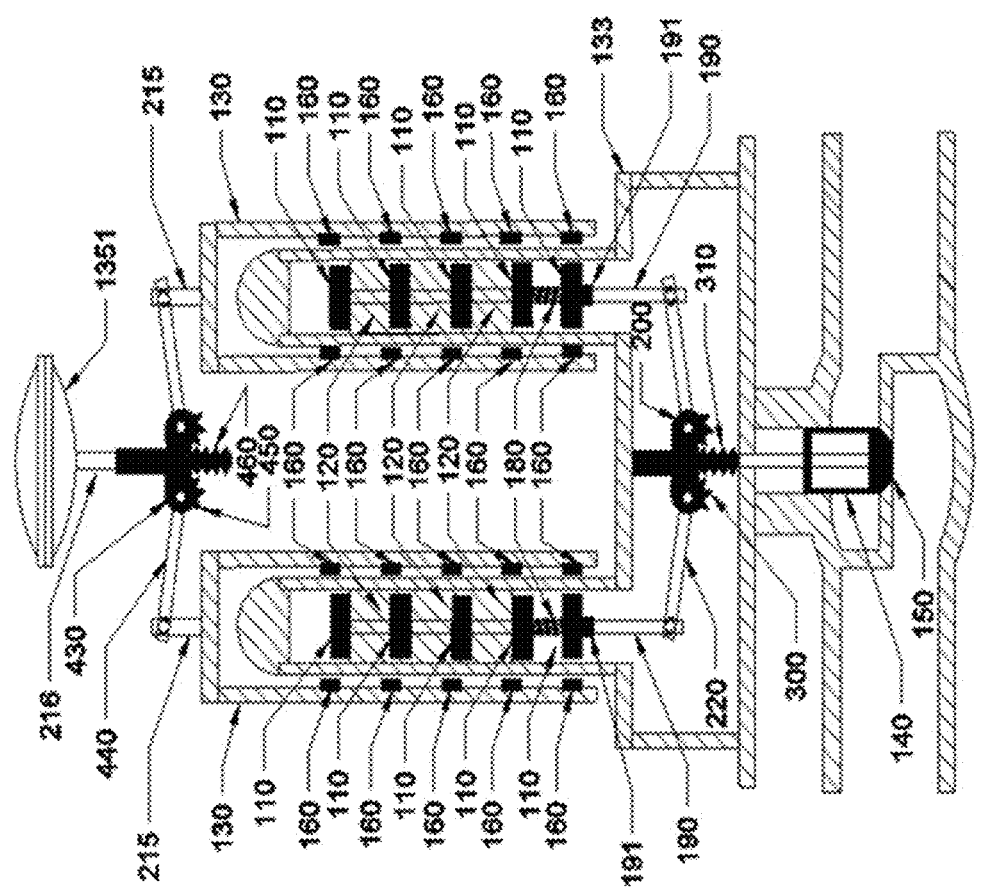
FIG. 18 depicts the valve of claim 17 in the closed position, in accordance with various aspects of the present disclosure.

FIG. 18 depicts the valve of claim 17 in the closed position, in accordance with various aspects of the present disclosure.

Figure 19A:
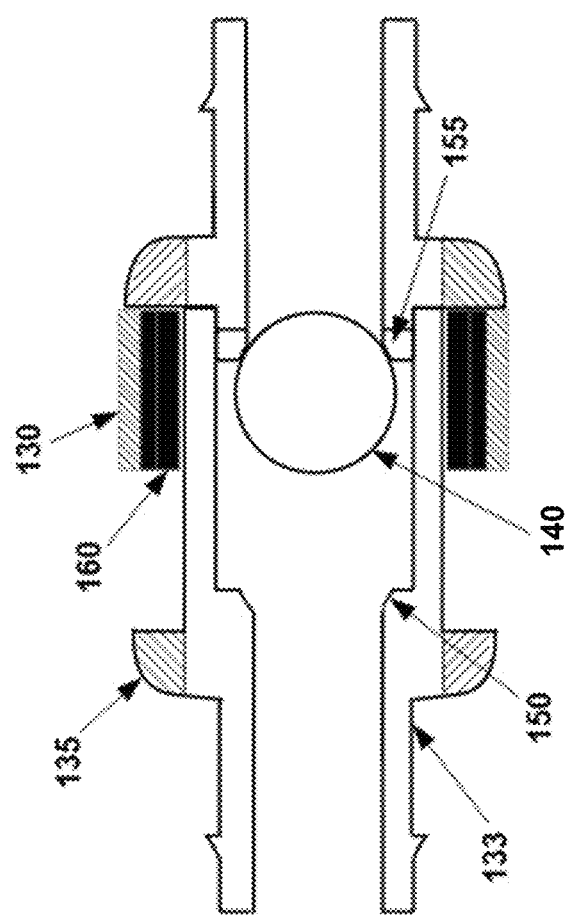
FIG. 19A depicts a cross-sectional side view of a sliding magnet-actuated ball-and-cage-type valve in the open position, in accordance with some aspects of the present disclosure.

FIG. 19A depicts a cross-sectional side view of a sliding magnet-actuated ball and cage type valve in the open position, in accordance with some aspects of the present disclosure. In the example, magnets 160 may slide horizontally to actuate the ball and cage valve. Valve ball retaining mechanism 155 may be a cage and/or other retaining mechanism effective to prevent the ball-shaped movable valve member 140 from completely blocking fluid flow through the valve (e.g., from left to right in FIG. 19A) while the valve is in the open position. In various examples, movable valve member 140 may comprise a ferromagnetic material and may thus transmit magnetic flux between magnets 160. In various examples, a ferromagnetic capture ring 135 may be disposed along the actuation path of magnet 160 at the terminus of the actuation path in either direction. The ferromagnetic capture ring 135 may be effective to retain the sliding magnets 160 in the desired position (e.g., either open or closed) during valve operation and may prevent the valve from actuating due to fluid pressure acting on the movable valve member 140. In various examples, the ball and cage valve depicted in FIGS. 19A-19B may be useful in small-scale applications such as medical applications, for instance.

Figure 19B:
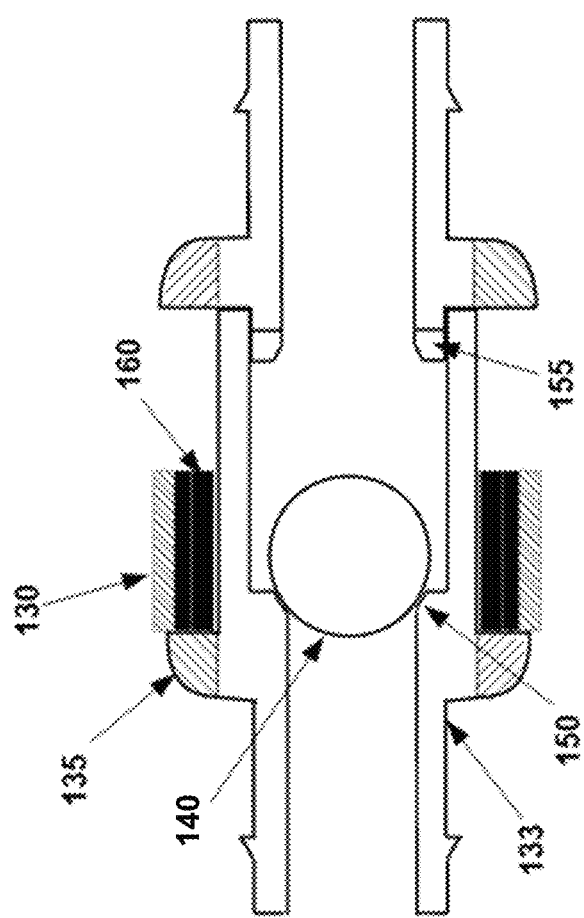
FIG. 19B depicts a cross-sectional side view of a sliding magnet-actuated ball-and-cage-type valve in the closed position, in accordance with some aspects of the present disclosure.

FIG. 19B depicts a cross-sectional side view of the sliding magnet-actuated ball and cage type valve of FIG. 19A in the closed position, in accordance with some aspects of the present disclosure.

Figure 20:
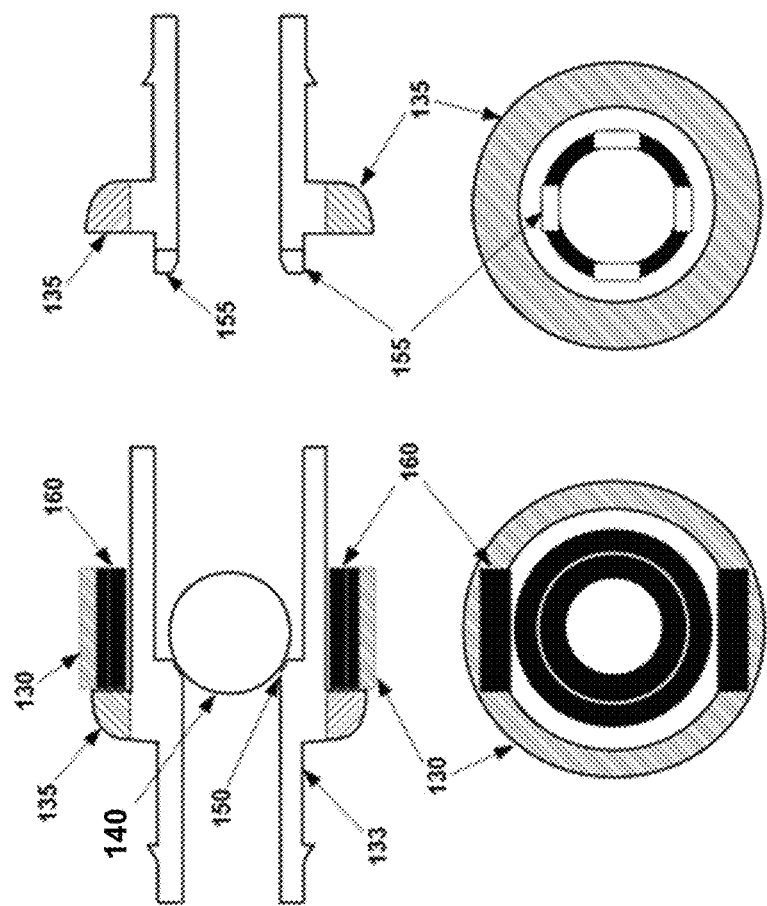
FIG. 20 depicts a cross-sectional view along the axis of flow of a sliding magnet-actuated ball-and-cage-type valve depicted in FIGS. 19A & 19B, in accordance with some aspects of the present disclosure.

FIG. 20 depicts a cross-sectional view along the axis of flow of the sliding magnet-actuated ball and cage type valve depicted in FIGS. 19A & 19B, in accordance with some aspects of the present disclosure. As depicted in FIG. 20, in some examples, valve ball retaining mechanism 155 may include projections around the circumference of the valve opening such that the valve ball retaining mechanism 155 contacts the movable valve member 140 when the ball and cage valve is in the open position and fluid is able to flow through the valve around the valve ball retaining mechanism 155.

Figure 21:
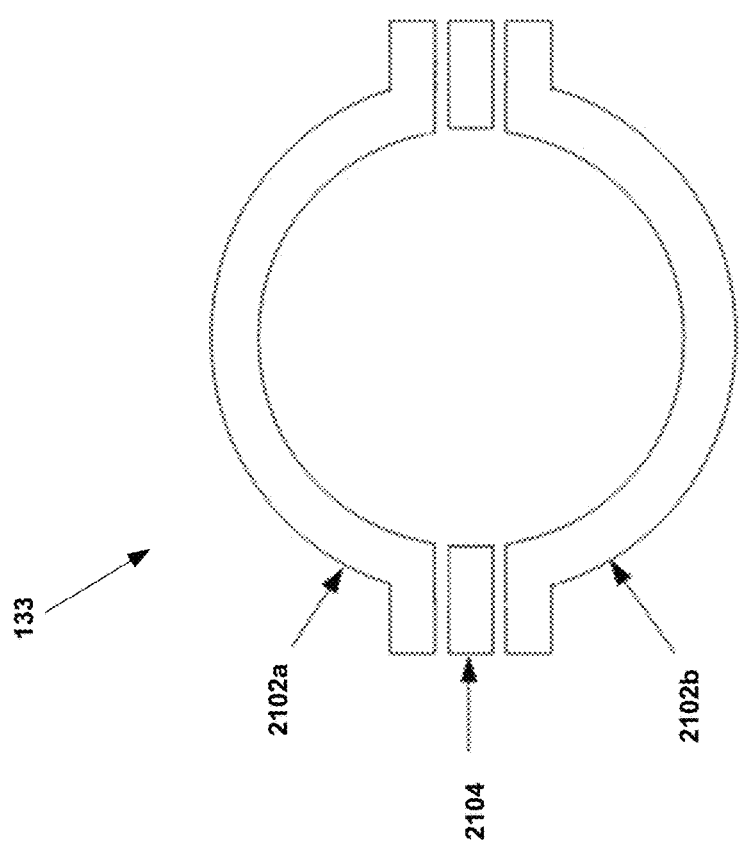
FIG. 21 depicts a potential assembly view along the axis of flow of a sliding magnet-actuated ball-and-cage-type valve depicted in FIGS. 19A & 19B, in accordance with some aspects of the present disclosure.

FIG. 21 depicts a potential assembly view along the axis of flow of a sliding magnet-actuated ball and cage type valve depicted in FIGS. 19A & 19B, in accordance with some aspects of the present disclosure.

In FIG. 21, the valve body (and in the case of this ball and cage valve, effectively the bonnet 133 or portion of the valve transmitting magnetic flux) is comprised of three pieces of material. In various examples, the two portions of bonnet 2102a and 2102b may have a different magnetic permeability relative to the third portion of the bonnet 2104. This configuration may lead to improved transmission of magnetic flux through portions of the bonnet with higher magnetic permeability (e.g., portions of bonnet 2102a and/or 2102b), while still channeling magnetic flux through the inner portion of the magnetic actuator. Linear forces may be generated, as the permeability of the remainder of the bonnet (e.g., third portion of bonnet 2104) may be relatively low as compared to portions of bonnet 2102a and/or 2102b so as to block and/or be a poor conductor of the magnetic flux. In various examples, the configuration depicted in FIG. 21 may be employed on larger sliding-stem valves as discussed in various other embodiments described herein, if beneficial for a particular application and/or valve architecture.

Figure 22:
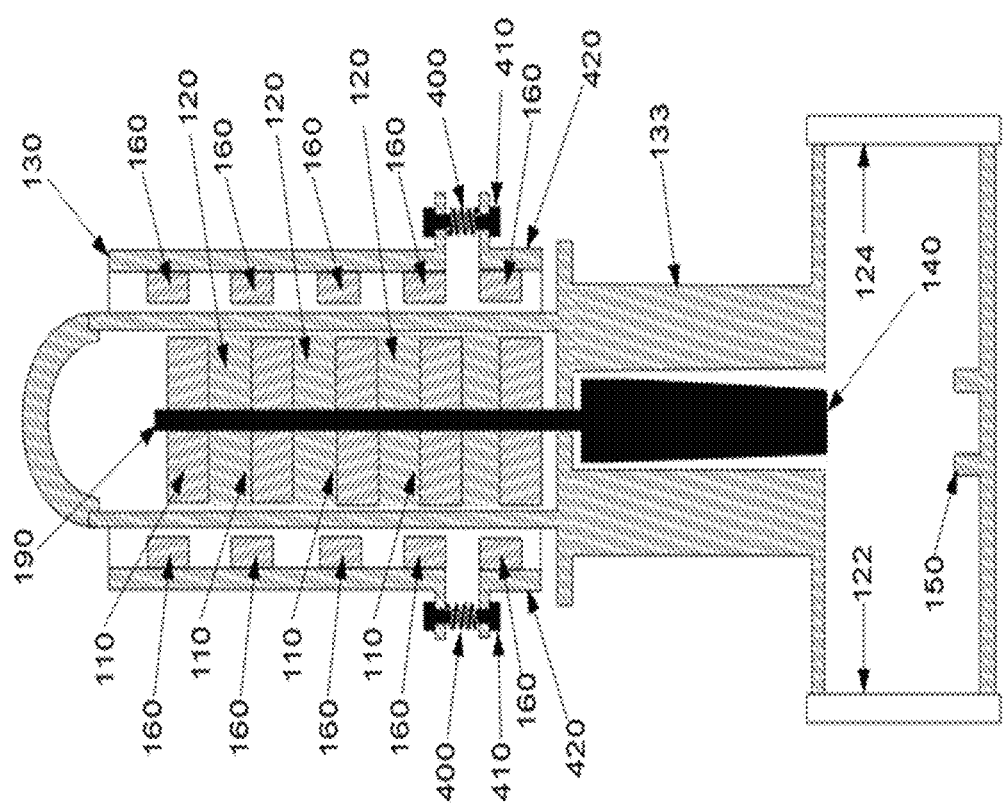
FIG. 22 depicts a cross-sectional side view of a magnet-actuated sliding stem gate valve in the open position that exhibits asymmetric forces depending on the direction of actuation with an external embodiment of the asymmetric actuation mechanism, in accordance with some aspects of the present disclosure.

FIG. 22 depicts a cross-sectional side view of a magnet-actuated sliding stem gate valve in the open position that exhibits asymmetric forces depending on the direction of actuation. The valve depicted in FIG. 22 comprises an external embodiment of the asymmetric actuation mechanism, in accordance with some aspects of the present disclosure. For example, external actuator 130 may be separated into an upper and a lower portion (e.g., back iron bottom piece 420) coupled by an external spring 400. Additionally, the valve depicted in FIG. 22 may comprise a pin 410 that may apply force on back iron bottom piece 420 during actuation of the valve from a closed to an open position. Accordingly, the actuation mechanism may exert greater force when opening the valve relative to closing the valve.

Figure 23:
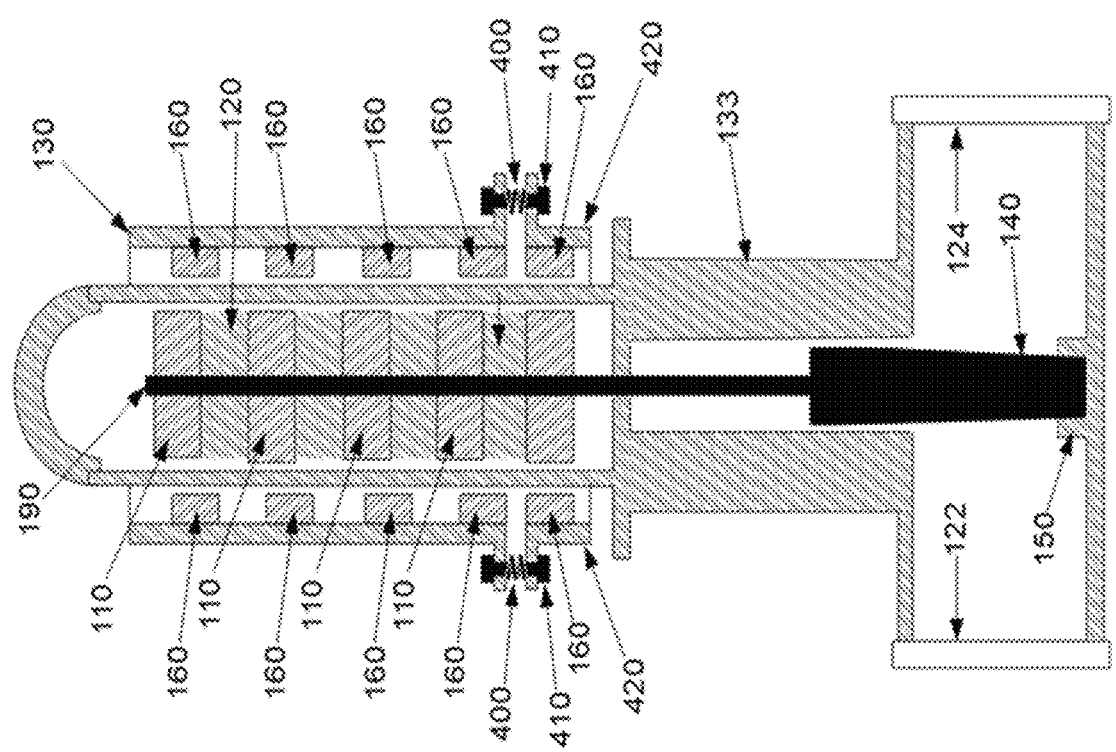
FIG. 23 depicts the valve of FIG. 22 in the closed position, in accordance with some aspects of the present disclosure.

FIG. 23 depicts the valve of FIG. 22 in the closed position, in accordance with some aspects of the present disclosure.

Figure 24:
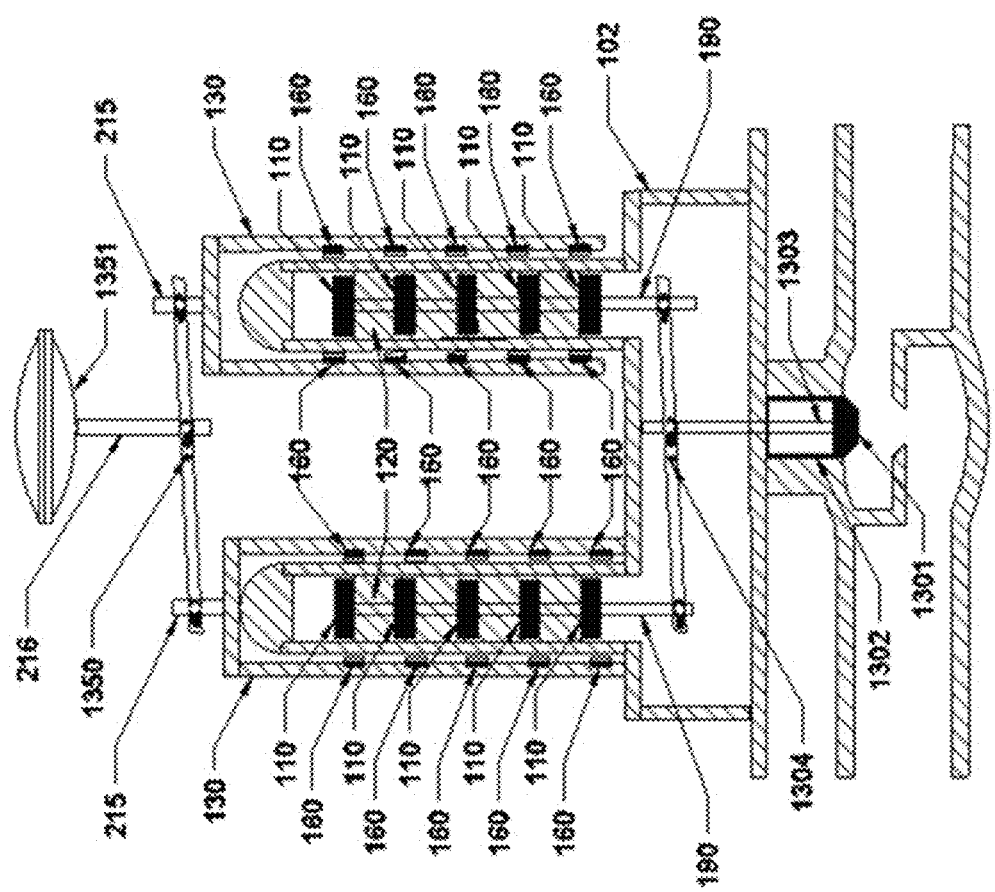
FIG. 24 depicts a cross-sectional side view of a magnet-actuated sliding stem globe valve in the open position including multiple magnetic couplings that operate in opposite directions, in accordance with some aspects of the present disclosure.

FIG. 24 depicts a cross-sectional side view of a magnet-actuated sliding stem globe valve in the open position that has multiple magnetic couplings that operate in opposite directions in a seesaw-like manner in order to increase the available actuation force and simultaneously reduce the displacement or entrainment of new fluid within the interior of the valve proximate to the internal mechanism. The valve depicted in FIG. 24 includes an external lever 1350 (e.g., external to the valve body/bonnet 133) and an internal lever 1304 (e.g., internal to the valve body/bonnet 133). In the valve depicted in FIG. 24, the range of motion of the magnetic coupling is increased and hence the force on the magnetic coupling is decreased. However, the force on the valve stem 1303 that is attached to the movable valve member 1302 is increased relative to that on the magnetic coupling due to the internal lever 1304. Accordingly, the internal lever 1304 may compensate for the external decrease in force on the coupling. The movable valve member 1302 may include beveled surfaces 1301 such that a seal is formed when the movable valve member 1302 is seated in the valve seat. The valve depicted in FIG. 24 includes an external pneumatic valve actuator 1351.

Figure 25:
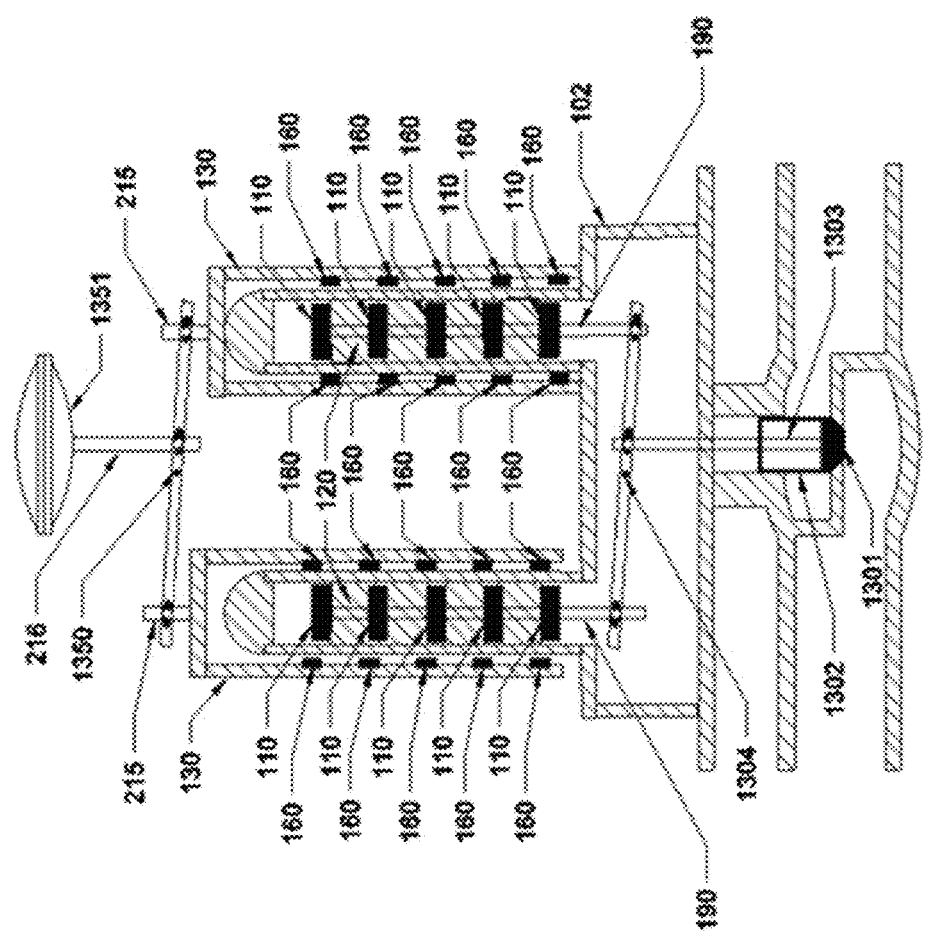
FIG. 25 depicts the valve of FIG. 24 in the closed position, in accordance with some aspects of the present disclosure.

FIG. 25 depicts a cross-sectional side view of the magnet-actuated sliding stem globe valve of FIG. 24 in the closed position, in accordance with various embodiments of the present disclosure.

Figure 26:
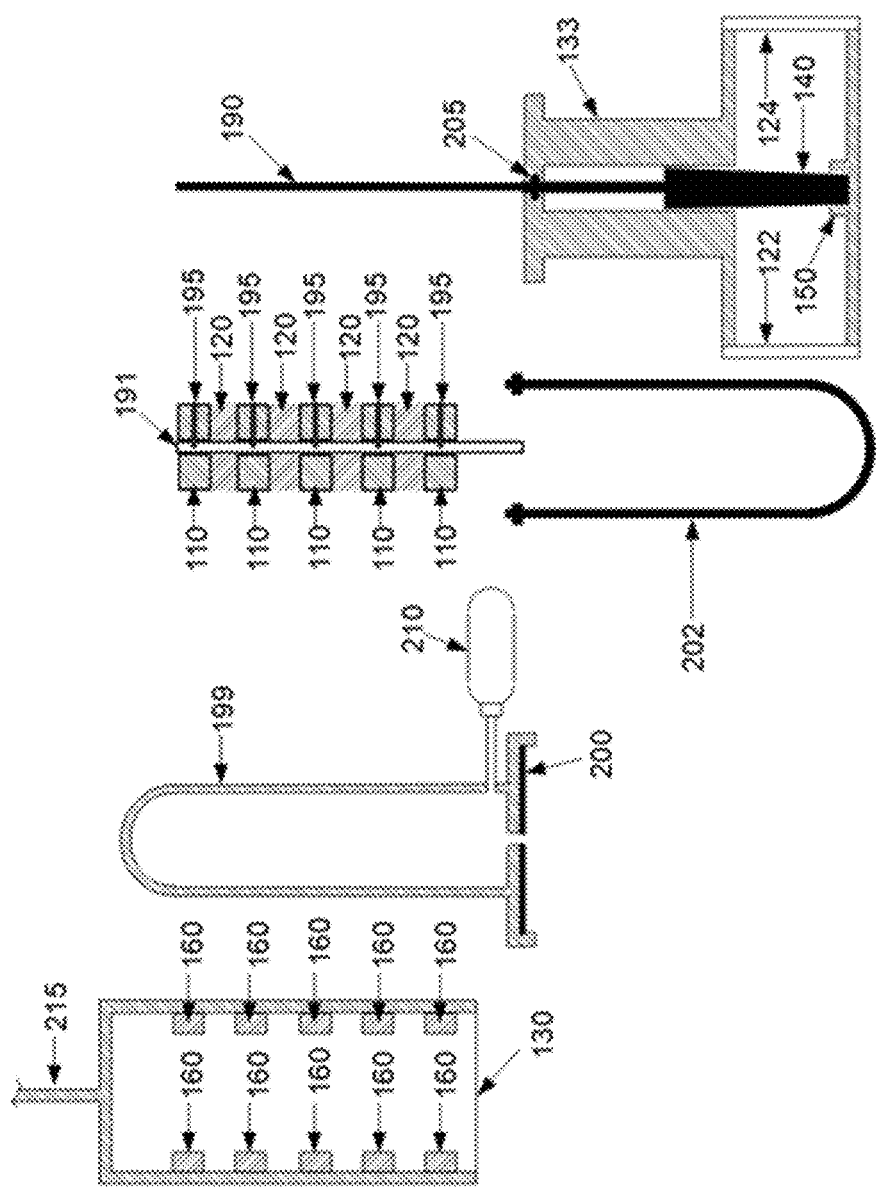
FIG. 26 depicts a cross-sectional side view of a magnet-actuated sliding stem gate and a retrofit kit that can convert it to magnetic actuation, in accordance with some aspects of the present disclosure.

FIG. 26 depicts a cross-sectional side view of a magnet-actuated sliding stem gate and a retrofit kit that can convert it to magnetic actuation, in accordance with some aspects of the present disclosure. Item or Items 195 may be features such as pins and/or setscrews that may be used to couple and/or secure the inner portion of the magnetic actuator (e.g., stem 191, internal ferromagnetic actuation members 110, and/or non-ferromagnetic material 120) of the retrofit kit to the existing valve stem 190. Mounting features 202 may comprise fasteners such as U-Bolts and/or clamps to secure the retrofit kit including secondary bonnet 199 (e.g., the outer bonnet) to the valve bonnet 133 (e.g., the bonnet of the valve to which the retrofit kit is being applied). Mounting features 202 may apply significant pressure against the new secondary static bonnet seal 200. Accordingly, secondary static bonnet seal 200 may seal secondary bonnet 199 and the original enclosure formed by original valve bonnet 133 even if gland seal 205 has failed (e.g., developed a leak). Accumulator 210 allows the original valve stem 190 to continue to slide through gland seal 205 without exacerbating any existing leaks by forcing additional fluid up and down through gland seal 205. Accumulator 210 negates the pressure and sucking action of the effective change of volume within the cavity defined by secondary bonnet 199 and original bonnet 133 due to the stem 190 moving in and out of the enclosure formed by secondary bonnet 199 and original bonnet 133).

Figure 27:
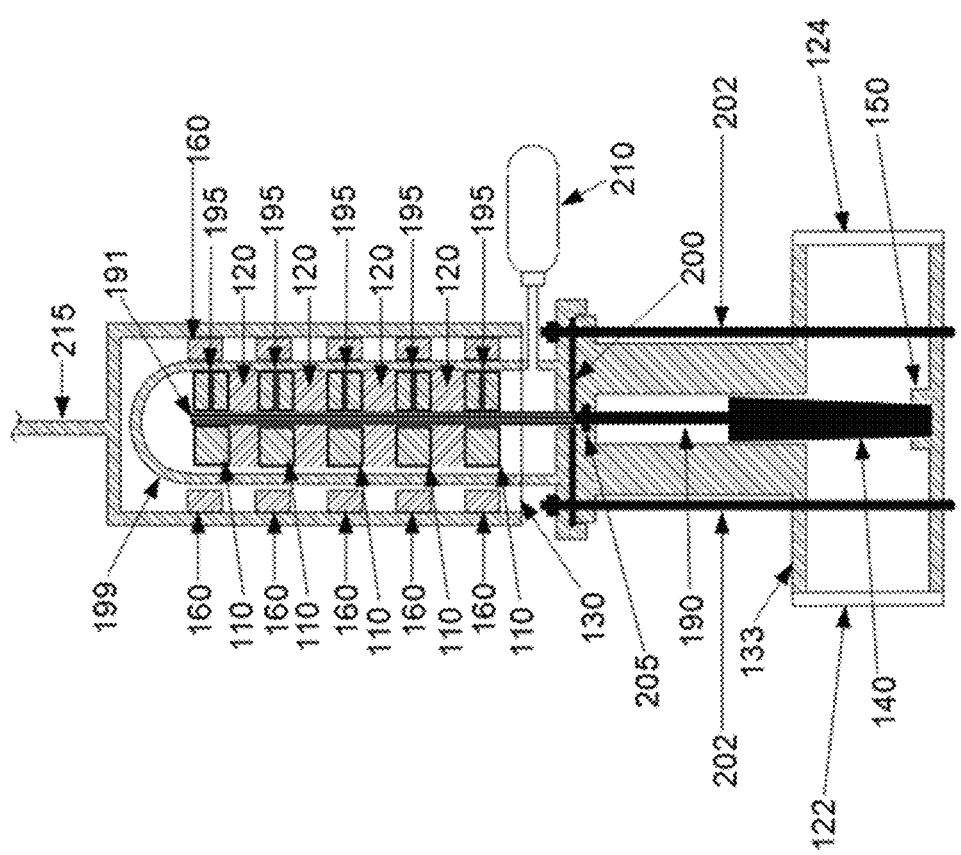
FIG. 27 depicts a cross-sectional side view of a magnet-actuated sliding stem gate with a retrofit kit installed that converts it to magnetic actuation, in accordance with some aspects of the present disclosure.

FIG. 27 depicts a cross-sectional side view of a magnet-actuated sliding-stem gate valve with the retrofit kit of FIG. 26 installed. The retrofit kit of FIG. 26 converts the sliding-stem gate valve to magnetic actuation, in accordance with some aspects of the present disclosure. Mounting features 202 may secure the retrofit kit (including the secondary bonnet 199) to the original sliding-stem gate valve bonnet 133 with significant pressure against the secondary static bonnet seal 200 even in the event that the gland seal 205 leaks. Accordingly, securing secondary bonnet 199 to bonnet 133 may pressurize the enclosure formed by the secondary bonnet 199 and the bonnet 133. In various examples, an external actuator 130 (e.g., a similar external magnetic actuator to those previously described herein) may be placed over and/or around the secondary bonnet 199 in order to actuate the retrofitted valve magnetically.

Among other potential benefits, valves in accordance with embodiments of the present disclosure create a magnetic flux circuit through a magnetic core (e.g., internal ferromagnetic actuation member 110) of a sealed valve). In various examples, the internal components of the valves described herein may not include permanent magnets. Accordingly, the valves may be heated without risk of demagnetizing the magnets (e.g., by exceeding their rated operating temperatures). Additionally, in various examples, the linearly actuated valves described herein may include a stack of magnetic couplings in order to increase the force of actuation for applications requiring large actuation forces. Further, in gate and stem valves actuated using the linear actuation mechanisms described herein, the stem (e.g., stem 190) may not require any threaded portion. This may be particularly advantageous as threaded stems can quickly degrade stem seals (through which the stem passes, sealing off the interior of the bonnet) leading to failure of the valve. The lack of a threaded portion of the stem may avoid entraining contaminants and/or fluids into the interior of the valve (e.g., within an interior of bonnet 133). Further, linear actuation mechanisms such as those described herein may be driven automatically by pneumatic and/or hydraulic actuators. Further, layering of the internal components (e.g., ferromagnetic layers separated by non-ferromagnetic layers) may provide a means of achieving a desired actuation force while preventing adjacent magnets from becoming stuck together due to magnetic forces and/or contamination.

The use of external magnets, which may be part of a valve handle or otherwise coupled to an external actuator of a valve, allows the external magnets to be insulated and/or cooled if the valve is to be operated in temperatures exceeding the rated operating temperatures of the external magnets. Additionally, the external magnets may be removed when the valve is constructed and/or serviced in temperatures exceeding the Curie temperatures of the external magnets. Many common commercial magnets, such as Neodymium magnets have relatively low recommended operating temperatures and Curie temperatures. Valves designed in accordance with embodiments of the present disclosure may use such magnets since the magnets may be insulated, cooled, and/or removed prior to the valve reaching temperatures in excess of the Neodymium magnet's recommended operating and/or Curie temperatures. Additionally, valves in accordance with embodiments of the present disclosure may not require a stem seal where the stem extrudes from the body of the valve. Accordingly, stem seal leaks, which are a significant issue with many traditional valves, may be avoided. Generally, while the embodiments depicted in the figures show examples using a certain number of external magnets, different numbers of magnets, apart from what is shown, may be used in accordance with the techniques and valve architectures described herein. The type and/or number of external magnets used in various valve configurations may be chosen based on a desired amount of force, based on design and manufacturing costs, and/or based on other concerns specific to a particular application. Therefore, the number of magnets shown in the various figures is not meant to be taken in a limiting sense and other, different numbers of external magnets are explicitly contemplated herein.

While the invention has been described in terms of particular embodiments and illustrative figures, those of ordinary skill in the art will recognize that the invention is not limited to the embodiments or figures described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A valve assembly, comprising:
   a valve bonnet;
   a valve stem disposed in the valve bonnet;
   a valve member coupled to a distal end of the valve stem, the valve member movable between a first position in which the valve assembly is closed and a second position in which the valve assembly is open;
   a first internal ferromagnetic actuation member comprising an impermanent magnet coupled to the valve stem;
   a second internal ferromagnetic actuation member coupled to the valve stem, wherein the first internal ferromagnetic actuation member and the second internal ferromagnetic actuation member are disposed in a spaced relationship along the valve stem; and
   an external actuator slidably engaged to an exterior surface of the valve bonnet, the external actuator comprising:
      a first magnet magnetically coupled to the first internal ferromagnetic actuation member through a first side of the valve bonnet;
      a second magnet magnetically coupled to the first internal ferromagnetic actuation member through a second side of the valve bonnet, the second side laterally opposing the first side, wherein the first magnet and the second magnet generate a magnetic flux path from the first magnet, through the first side of the valve bonnet to the first internal ferromagnetic actuation member, through the second side of the valve bonnet to the second magnet; and
      a third magnet magnetically coupled to the second internal ferromagnetic actuation member through the valve bonnet;
   wherein linear translation of the external actuator in a first direction causes the first magnet to apply a first force on the first internal ferromagnetic actuation member in the first direction and causes the third magnet to apply a second force on the second internal ferromagnetic actuation member in the first direction, wherein the first force and the second force are effective to linearly translate the valve stem, causing linear translation of the valve member into the first position; and
   wherein linear translation of the external actuator in a second direction causes the first magnet to apply a third force on the first internal ferromagnetic actuation member in the second direction and causes the third magnet to apply a fourth force on the second internal ferromagnetic actuation member in the second direction, wherein the third force and the fourth force are effective to linearly translate the valve stem, causing linear translation of the valve member into the second position.

2. The valve assembly of claim 1, wherein:
   the first internal ferromagnetic actuation member comprises an opening through which the valve stem is slidably engaged.

3. The valve assembly of claim 2, wherein:
the second internal ferromagnetic actuation member is rigidly coupled to the valve stem.

4. The valve assembly of claim 3, further comprising:
a spring, wherein a first end of the spring is attached to a lower side of the first internal ferromagnetic actuation member and a second end of the spring is attached to an upper side of the second internal ferromagnetic actuation member.

5. The valve assembly of claim 1, further comprising:
a spring, wherein a first end of the spring is attached to a lower side of the first internal ferromagnetic actuation member and a second end of the spring is attached to an upper side of the second internal ferromagnetic actuation member.

6. The valve assembly of claim 1, wherein the valve bonnet is a first bonnet, and wherein the first internal ferromagnetic actuation member and the second internal ferromagnetic actuation member are disposed in a first stack in the first bonnet, the valve assembly further comprising:
a second bonnet;
a third internal ferromagnetic actuation member; and
a fourth internal ferromagnetic actuation member, wherein the third internal ferromagnetic actuation member and the fourth internal ferromagnetic actuation member are disposed in a second stack in the second bonnet.

7. The valve assembly of claim 1, wherein the external actuator comprises a first portion and a second portion, the valve assembly further comprising a spring coupling the first portion to the second portion, wherein the first magnet is disposed on the first portion and the third magnet is disposed on the second portion.

8. The valve assembly of claim 1, further comprising a non-ferromagnetic material disposed between the first internal ferromagnetic actuation member and the second internal ferromagnetic actuation member.

9. The valve assembly of claim 1, further comprising a pin attached to the valve stem, wherein the external actuator sliding along the valve bonnet in the second direction causes the first internal ferromagnetic actuation member to exert a fifth force on the pin.

10. The valve assembly of claim 1, wherein:
the valve stem passes through an opening in the first internal ferromagnetic actuation member such that the first internal ferromagnetic actuation member is slidably engaged with the valve stem; and
the second internal ferromagnetic actuation member is directly attached to the valve stem, wherein the external actuator sliding along the valve bonnet in the first direction compresses a spring disposed between the first internal ferromagnetic actuation member and the second internal ferromagnetic actuation member.

11. The valve assembly of claim 1, further comprising an internal mechanism disposed in the valve bonnet and operatively coupled to the valve stem, wherein the internal mechanism comprises a lever or gear.

12. The valve assembly of claim 1, further comprising an external mechanism operatively coupled to the external actuator, wherein the external mechanism comprises a lever or gear.

13. A method of actuating a valve, the method comprising:
moving an external actuator slidably engaged to an exterior surface of a valve bonnet in a first direction, the external actuator comprising:
a first magnet magnetically coupled to a first internal ferromagnetic actuation member through a first side of the valve bonnet, the first internal ferromagnetic actuation member being disposed within the valve bonnet;
a second magnet magnetically coupled to the first internal ferromagnetic actuation member through a second side of the valve bonnet, the second side laterally opposing the first side, wherein the first magnet and the second magnet generate a magnetic flux path from the first magnet, through the first internal ferromagnetic actuation member, to the second magnet; and
a third magnet magnetically coupled to a second internal ferromagnetic actuation member disposed within the valve bonnet;
wherein linear translation of the external actuator in a first direction causes the first magnet to apply a first force on the first internal ferromagnetic actuation member in the first direction and causes the third magnet to apply a second force on the second internal ferromagnetic actuation member in the first direction, wherein the first force and the second force are effective to linearly translate a valve stem, causing linear translation of a valve member into a first position; and
wherein linear translation of the external actuator in a second direction causes the first magnet to apply a third force on the first internal ferromagnetic actuation member in the second direction and causes the third magnet to apply a fourth force on the second internal ferromagnetic actuation member in the second direction, wherein the third force and the fourth force are effective to linearly translate the valve stem, causing linear translation of the valve member into a second position.

14. The method of claim 13, wherein a valve stem passes through an opening in the first internal ferromagnetic actuation member such that the linear translation of the external actuator in the first direction causes the first internal ferromagnetic actuation member to slide along the valve stem.

15. The method of claim 14, wherein:
the second internal ferromagnetic actuation member is rigidly coupled to the valve stem such that the linear translation of the external actuator in the second direction causes the second internal ferromagnetic actuation member to move along with the valve stem.

16. The method of claim 13, further comprising coupling the external actuator of the valve to a pneumatic valve actuator or hydraulic valve actuator.

17. A valve assembly, comprising:
a valve bonnet;
a valve stem disposed in the valve bonnet;
a valve member coupled to a distal end of the valve stem, the valve member movable between a first position in which the valve assembly is closed and a second position in which the valve assembly is open;
a first internal ferromagnetic actuation member coupled to the valve stem;
a second internal ferromagnetic actuation member coupled to the valve stem, wherein the first internal ferromagnetic actuation member and the second internal ferromagnetic actuation member are disposed in a spaced relationship along the valve stem; and
an external actuator slidably engaged to an exterior surface of the valve bonnet, the external actuator comprising:

a first magnet magnetically coupled to the first internal ferromagnetic actuation member through a first side of the valve bonnet;

a second magnet magnetically coupled to the first internal ferromagnetic actuation member through a second side of the valve bonnet, the second side laterally opposing the first side, wherein the first magnet and the second magnet generate a magnetic flux path from the first magnet, through the first internal ferromagnetic actuation member, to the second magnet; and a third magnet magnetically coupled to the second internal ferromagnetic actuation member through the valve bonnet.

18. The valve assembly of claim 17, wherein the first internal ferromagnetic actuation member comprises an opening through which the valve stem is slidably engaged.

19. The valve assembly of claim 18, wherein:

the second internal ferromagnetic actuation member is rigidly coupled to the valve stem.

20. The valve assembly of claim 17, further comprising:

a spring disposed between the first internal ferromagnetic actuation member and the second internal ferromagnetic actuation member.

\* \* \* \* \*